United States Patent
Narahara et al.

(10) Patent No.: US 10,260,458 B2
(45) Date of Patent: Apr. 16, 2019

(54) HOMOGENEOUS CHARGE COMPRESSION IGNITION ENGINE

(71) Applicant: MAZDA MOTOR CORPORATION, Hiroshima (JP)

(72) Inventors: Kazuaki Narahara, Aki-gun (JP); Yoshihisa Nou, Hiroshima (JP); Masahiko Fujimoto, Hiroshima (JP); Keiji Araki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/686,405

(22) Filed: Aug. 25, 2017

(65) Prior Publication Data
US 2018/0058383 A1  Mar. 1, 2018

(30) Foreign Application Priority Data

Sep. 1, 2016 (JP) .................................. 2016-170520
Sep. 1, 2016 (JP) .................................. 2016-170521

(51) Int. Cl.
*F02M 25/022* (2006.01)
*F02B 9/02* (2006.01)
(Continued)

(52) U.S. Cl.
CPC ........... *F02M 25/0227* (2013.01); *F02B 9/02* (2013.01); *F02B 47/02* (2013.01); *F02M 25/03* (2013.01); *Y02T 10/121* (2013.01)

(58) Field of Classification Search
CPC .... F02B 1/12; F02B 3/06; F02B 47/02; F02B 9/02; F02D 41/3035; F02D 41/0025
See application file for complete search history.

(56) References Cited

U.S. PATENT DOCUMENTS 5,832,880 A * 11/1998 Dickey ..................... F02B 1/12
                                                           123/25 C
5,875,743 A *  3/1999 Dickey ..................... F02B 1/12
                                                           123/25 C
(Continued)

FOREIGN PATENT DOCUMENTS

DE        601 17 854 T2    12/2006
JP        2000-204990 A     7/2000
(Continued)

OTHER PUBLICATIONS

DE Office Action dated Jan. 19, 2018, from corresponding DE Appl No. 10 2017 119 510.6, with English translation, 12 pp.
(Continued)

*Primary Examiner* — Long T Tran
(74) *Attorney, Agent, or Firm* — Studebaker & Brackett PC

(57) ABSTRACT

A homogeneous charge compression ignition engine includes a cylinder configured to accommodate a piston to be reciprocally movable, a fuel injection valve configured to inject fuel into the cylinder, a water injection valve configured to inject water into the cylinder, a fuel injection control module configured to inject fuel from the fuel injection valve into the cylinder at such a timing that a mixture of fuel and air is self-ignited in a latter stage of a compression stroke or in an initial stage of an expansion stroke, and a water injection control module configured to perform at least a basic water injection of injecting water from the water injection valve into the cylinder during a predetermined period, which starts concurrently with or after start of combustion by the self-ignition and which overlaps a combustion period.

17 Claims, 10 Drawing Sheets

(51) Int. Cl.
  *F02B 47/02*  (2006.01)
  *F02M 25/03*  (2006.01)

(56) References Cited

U.S. PATENT DOCUMENTS

| | | | |
|---|---|---|---|
| 7,421,999 B2* | 9/2008 | Kim | F02D 41/0025 |
| | | | 123/25 C |
| 8,434,431 B2* | 5/2013 | Fried | F02B 47/02 |
| | | | 123/1 A |
| 2002/0073940 A1 | 6/2002 | Simescu et al. | |
| 2004/0003781 A1* | 1/2004 | Yuki | F02B 47/02 |
| | | | 123/250 |
| 2007/0215095 A1* | 9/2007 | Kakuya | F02D 37/02 |
| | | | 123/295 |
| 2008/0066715 A1* | 3/2008 | Jankovic | F02B 17/005 |
| | | | 123/302 |
| 2008/0127931 A1 | 6/2008 | Kuo | |
| 2011/0108012 A1* | 5/2011 | Bryant | F02B 19/1023 |
| | | | 123/568.11 |
| 2014/0116374 A1* | 5/2014 | Brown | F02M 25/03 |
| | | | 123/25 C |

FOREIGN PATENT DOCUMENTS

| | | |
|---|---|---|
| JP | 2004-068776 A | 3/2004 |
| JP | 2004-197593 A | 7/2004 |
| JP | 2009-138661 A | 6/2009 |
| JP | 2009-209809 A | 9/2009 |
| JP | 2010-001852 A | 1/2010 |
| JP | 2010-236466 A | 10/2010 |
| JP | 2018-035763 A | 3/2018 |

OTHER PUBLICATIONS

An Office Action issued by the Japanese Patent Office dated Apr. 3, 2018, which corresponds to Japanese Patent Application No. 2016-170520 and is related to U.S. Appl. No. 15/686,405; with English translation.

An Office Action issued by the Japanese Patent Office dated Apr. 3, 2018, which corresponds to Japanese Patent Application No. 2016-170521 and is related to U.S. Appl. No. 15/686,405; with English translation.

* cited by examiner

US 10,260,458 B2

HOMOGENEOUS CHARGE COMPRESSION IGNITION ENGINE

TECHNICAL FIELD

The present invention relates to a homogeneous charge compression ignition engine configured to combust fuel by self-ignition while mixing fuel injected into a cylinder with air.

BACKGROUND ART

As an example of the aforementioned engine, there is known an engine disclosed in Japanese Unexamined Patent Publication No. 2009-209809. In the engine disclosed in Japanese Unexamined Patent Publication No. 2009-209809, during an operation in a predetermined premixed combustion range, control such that a part of exhaust gas discharged to an exhaust passage is introduced into a cylinder as EGR gas, and fuel is injected into the cylinder at a timing earlier than the compression top dead center is performed. In this way, injecting fuel into a cylinder where EGR gas as inert gas exists makes it possible to cause self-ignition of injected fuel after a predetermined ignition delay, whereby appropriate combustion with a less amount of NOx or soot is performed.

In a case where the load of an engine increases, it is necessary to introduce a large amount of air (fresh air) into a cylinder in order to secure a high output for the load. As a result, in a high load range of the engine, a sufficient amount of EGR gas may not be introduced into the cylinder, which may cause self-ignition too early or may cause steep combustion. On the other hand, in a case where a large supercharger is incorporated in an engine, for instance, it may be possible to introduce both of air and EGR gas sufficiently into a cylinder. However, the aforementioned configuration may excessively increase an inner pressure of the cylinder (a cylinder pressure) during combustion, and large noise may be generated, which may adversely affect reliability of the engine.

In view of the above, as a method for solving the aforementioned inconveniences, there is proposed a method in which water is directly injected into a cylinder. Employing the aforementioned method makes it possible to supply a required amount of water into the cylinder without causing shortage of the air amount. This may make it possible to control combustion to such an extent that the cylinder pressure does not excessively increase, while securing a sufficient output torque. However, unless an injection period is provided in such a manner that water exists at an appropriate timing during combustion, large combustion noise may be generated by a rapid increase in the cylinder pressure after combustion starts, for instance. This may lower the commercial value of the engine.

SUMMARY OF INVENTION

In view of the above, an object of the present invention is to provide a homogeneous charge compression ignition engine, which enables to suppress an increase in the cylinder pressure while securing an output torque of the engine.

A homogeneous charge compression ignition engine of the present invention includes a cylinder configured to accommodate a piston to be reciprocally movable; a fuel injection valve configured to inject fuel into the cylinder; a water injection valve configured to inject water into the cylinder; and a control device configured to combust a mixture of fuel injected from the fuel injection valve and air by self-ignition within the cylinder. The control device includes a fuel injection control module configured to inject fuel from the fuel injection valve into the cylinder at such a timing that the air-fuel mixture is self-ignited in a latter stage of a compression stroke or in an initial stage of an expansion stroke, and a water injection control module configured to perform at least a basic water injection of injecting water from the water injection valve into the cylinder during a predetermined period which starts concurrently with or after start of combustion by the self-ignition and which overlaps a combustion period.

These and other objects, features and advantages of the present invention will become more apparent upon reading the following detailed description along with the accompanying drawings.

BRIEF DESCRIPTION OF DRAWINGS

DESCRIPTION OF EMBODIMENTS (1) First Embodiment (i) Overall Configuration of Engine FIG. 1 and FIG. 2 are diagrams illustrating a homogeneous charge compression ignition engine according to the first embodiment of the present invention. The engine illustrated in FIG. 1 and FIG. 2 is a 4-cycle gasoline engine mounted in a vehicle as a power source for traveling. The engine includes an in-line multi-cylinder engine body 1 having four cylinders 2 arranged in a row, an intake passage 20 for passing intake air to be introduced to the engine body 1, an exhaust passage 30 for passing exhaust gas discharged from the engine body 1, an EGR device 40 for returning a part of exhaust gas passing through the exhaust passage 30 to the intake passage 20, and a water supply system 50 for supplying water extracted from exhaust gas passing through the exhaust passage 30 to each cylinder 2 of the engine body 1. The water supply device 50 corresponds to a critical water generation device in the claims.

As illustrated in FIG. 2, the engine body 1 includes a cylinder block 3 in which the cylinders 2 are formed, a cylinder head 4 mounted on a top surface of the cylinder block 3 in such a manner as to cover the cylinders 2 from above, and a piston 5 accommodated in each cylinder 2 to be reciprocally movable.

Figure 1:
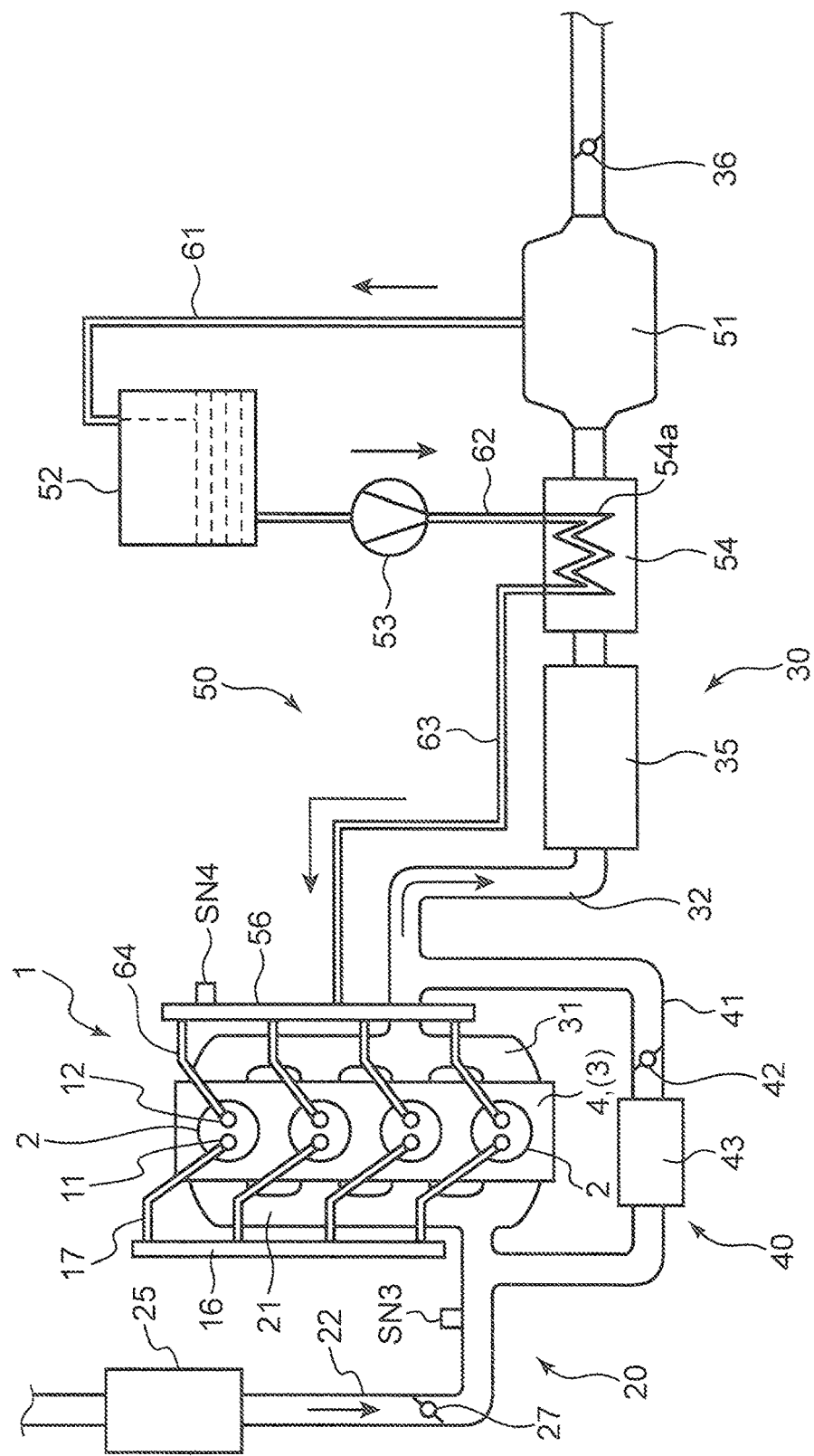
FIG. 1 is a diagram illustrating an overall configuration of a homogeneous charge compression ignition engine according to a first embodiment of the present invention.

A combustion chamber C is defined above the piston 5. Fuel containing gasoline as a main component to be injected from a fuel injection valve 11 to be described later is supplied into the combustion chamber C. Further, supplied fuel is combusted in the combustion chamber C, and the piston 5 pushed down by an expansion force by the combustion is reciprocally moved up and down.

A crankshaft 15 as an output shaft of the engine body 1 is disposed below the piston 5. The crankshaft 15 is connected to the piston 5 via a connecting rod 14, and is rotated around a central axis thereof, as the piston 5 reciprocates. A crank angle sensor SN1 for detecting a rotational angle (a crank angle) of the crankshaft 15 is disposed in the cylinder block 3. The crank angle sensor SN1 also serves as a sensor for detecting a rotational speed of the crankshaft 15, in other words, an output rotational speed (an engine speed) of the engine body 1.

A cavity 10 recessed downwardly on the side opposite to the cylinder head 4 is formed in a center portion of a crown surface (a top surface) of the piston 5. The cavity 10 is formed to have a volume that occupies a large part of the combustion chamber C when the piston 5 is lifted to the top dead center.

In the cylinder head 4, a fuel injection valve 11 for injecting fuel (gasoline) supplied from an unillustrated fuel pump into the combustion chamber C is disposed for each cylinder 2 (four fuel injection valves 11 in total). A fuel rail 16 (see FIG. 1) for storing fuel supplied from the fuel pump while keeping the fuel pressure is provided above the fuel injection valve 11. Fuel stored in the fuel rail 16 is supplied to each fuel injection valve 11 through four distribution pipes 17 whose number is equal to the number of the fuel injection valves 11.

The fuel injection valve 11 has a distal end exposed to the combustion chamber C in the vicinity of the central axis of the cylinder 2 so that fuel is injected from the distal end of the fuel injection valve 11 toward the cavity 10 of the piston 5. Specifically, the fuel injection valve 11 injects at least a part of fuel of the amount to be injected per cycle before the piston 5 reaches the compression top dead center. After injected fuel is mixed with air (intake air) introduced into the combustion chamber C, the air-fuel mixture is self-ignited in the vicinity of the compression top dead center, for instance.

Specifically, the engine of the embodiment is configured such that not spark ignition combustion (combustion such that an air-fuel mixture is forcibly ignited by spark ignition), which is generally employed in a case where gasoline is used as fuel, but HCCI (homogeneous charge compression ignition) combustion such that an air-fuel mixture is self-ignited resulting from compression by the piston 5 is performed in all the operating ranges of the engine. In view of the above, a spark plug for igniting an air-fuel mixture is not provided in the engine of the embodiment. As an alternative configuration, there is proposed a configuration, in which spark ignition combustion is performed in place of HCCI combustion in a condition that it is difficult to cause self-ignition, for instance, immediately after the engine is started in a cold state. Further, there is also proposed a configuration, in which so-called spark assistance is performed in order to assist HCCI combustion after the engine is warmed up. In view of the above, it is possible to provide a spark plug in order to perform the control as described above.

In order to enable HCCI combustion as described above, in the engine of the embodiment, the compression ratio of each cylinder 2 is set to a relatively high value, as compared with a general gasoline engine in which spark ignition combustion is employed. Specifically, in the embodiment, the geometric compression ratio of each cylinder 2, in other words, the ratio of the volume of the combustion chamber C in a case where the piston 5 is at the top dead center to the volume of the combustion chamber C in a case where the piston 5 is at the bottom dead center is set to be not smaller than 18 but not larger than 35, and preferably, not smaller than 18 but not larger than 30.

In the cylinder head 4, a water injection valve 12 for injecting water supplied from the water supply device 50 into the combustion chamber C is disposed for each cylinder 2 (four water injection valves 12 in total). The water injection valve 12 is disposed to adjoin the fuel injection valve 11 with respect to the central axis of the cylinder 2.

Figure 2:
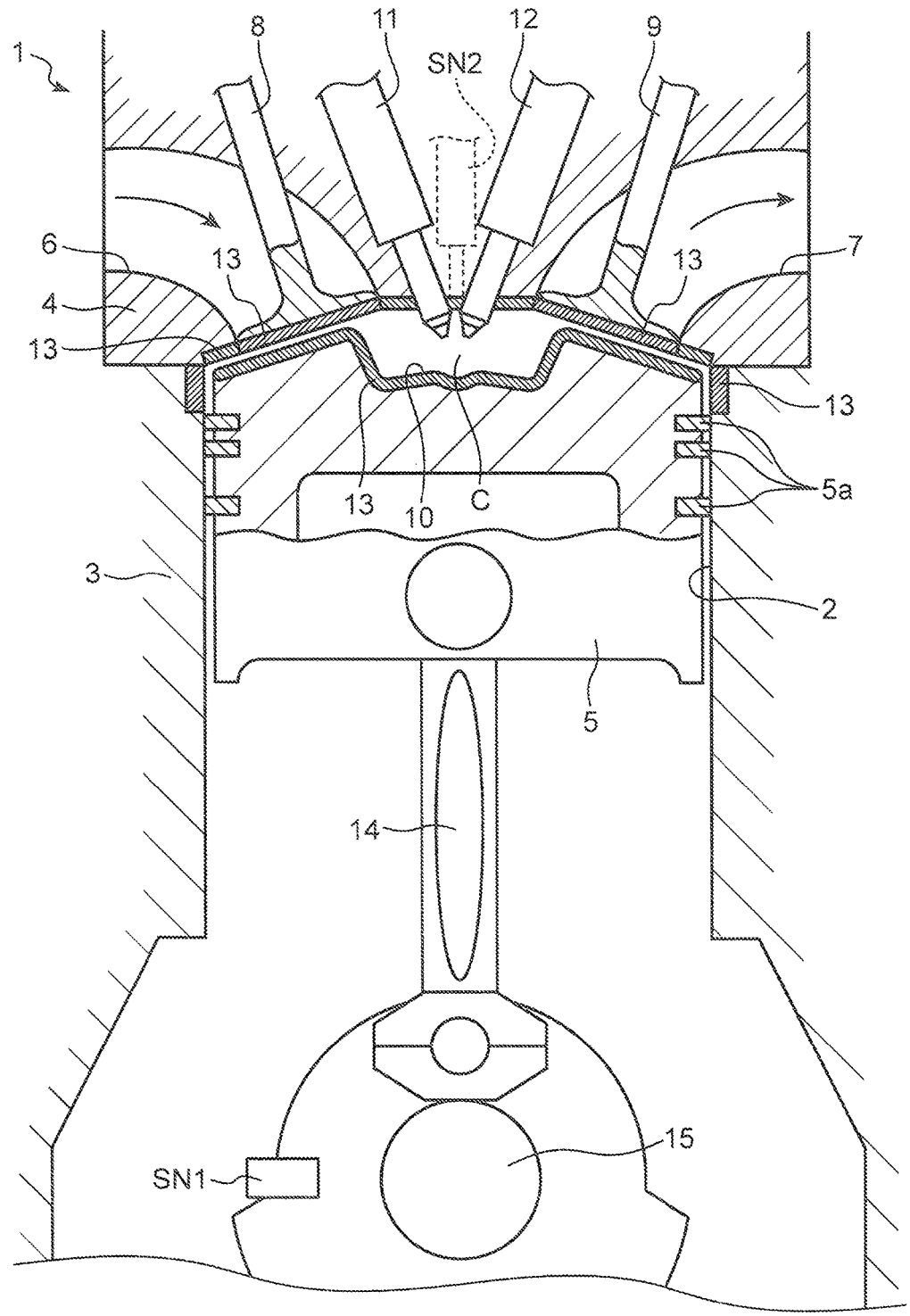
FIG. 2 is a sectional view of an engine body.

As illustrated in FIG. 2, in the cylinder head 4, an intake port 6 for introducing air to be supplied from the intake passage 20 into the combustion chamber C, an exhaust port 7 for discharging exhaust gas generated in the combustion chamber C into the exhaust passage 30, an intake valve 8 for opening and closing an opening of the intake port 6 on the side of the combustion chamber C, and an exhaust valve 9 for opening and closing an opening of the exhaust port 7 on the side of the combustion chamber C are disposed for each cylinder 2.

The intake valve 8 and the exhaust valve 9 are driven to open and close in association with rotation of the crankshaft 15 by an unillustrated valve driving mechanism. A valve driving mechanism for the intake valve 8 internally includes an intake valve variable mechanism 18 (see FIG. 4) capable of changing at least a closing timing of the intake valve 8. The intake valve variable mechanism 18 changes a closing timing of the intake valve 8 depending on an operating condition of the engine. The effective compression ratio of each cylinder 2, in other words, the ratio of the volume of the combustion chamber C when the piston 5 is at the top dead center to the volume of the combustion chamber C at a point of time when the intake valve 8 is closed is changed depending on the change in the closing timing of the intake valve 8. The intake valve variable mechanism 18 may be a variable mechanism operative to change only the closing timing of the intake valve 8 while keeping the opening timing of the intake valve 8 unchanged (the lift amount is changed depending on the change in the closing timing of the intake valve 8), or may be a phase variable mechanism operative to concurrently change the opening timing and the closing timing of the intake valve 8.

A heat insulating layer 13 is formed on each part constituting an inner wall of the combustion chamber C, in other words, an inner wall surface of the cylinder block 3, a crown surface of the piston 5, a lower surface of the cylinder head 4, and a lower surface of a valve head of each of the intake valve 8 and the exhaust valve 9. The heat insulating layer 13 formed on the inner wall surface of the cylinder block 3 is formed only on the upper side i.e. on the side of the cylinder head 4 with respect to a piston ring 5a in a state that the piston 5 is at the top dead center so that the piston ring 5a does not slide over the heat insulating layer 13.

The heat insulating layer 13 is made of a material having a thermal conductivity and a volumetric specific heat lower than those of the materials of the cylinder block 3, the cylinder head 4, the piston 5, the intake valve 8, and the exhaust valve 9. This is for the purpose of suppressing release of heat of combustion gas generated in the combustion chamber C to the outside of the combustion chamber C, and for reducing cooling loss of the engine. Specifically, a low thermal conductivity of the heat insulating layer 13 makes it possible to suppress transfer of heat of combustion gas to the cylinder block 3, the cylinder head 4, and the like through the heat insulating layer 13. Further, a low volumetric specific heat of the heat insulating layer 13 makes it possible to suppress a temperature difference between the heat insulating layer 13 and combustion gas, and to suppress heat transfer due to the temperature difference. For instance, main components of the engine body 1 such as the cylinder block 3 and the cylinder head 4 have a large volumetric specific heat. In addition to the above, the main components are cooled by cooling water. Therefore, even if the inside of the cylinder 2 is temporarily brought to a high temperature state by combustion, the temperatures of the main components are kept to a relatively low temperature. When it is assumed that the heat insulating layer 13 is not formed, high-temperature combustion gas may directly come into contact with inner wall surfaces of the main components in a low temperature state, and a large heat transfer due to the temperature difference between these elements may occur. On the other hand, in a case where the heat insulating layer 13 of a low volumetric specific heat is formed, the temperature of the heat insulating layer 13 follows the temperature of combustion gas with enhanced responsiveness. This makes it possible to suppress heat transfer as described above, and to reduce cooling loss.

It is possible to form the heat insulating layer 13 by coating a ceramic material such as $ZrO_2$ by plasma spraying. In this configuration, it is possible to contain a multitude of pores inside the heat insulating layer 13. Such a porous heat insulating layer is advantageous in reducing a thermal conductivity and a volumetric specific heat.

As illustrated in FIG. 2, in the cylinder head 4, a cylinder pressure sensor SN2 for detecting an inner pressure of the cylinder 2 (hereinafter, referred to as a cylinder pressure) is disposed for each cylinder 2 (four cylinder pressure sensors SN2 in total). Each cylinder pressure sensor SN2 has, at a distal end thereof, a detection element operative to change the electromotive force depending on the magnitude of a pressure. The detection element is mounted to the cylinder head 4 in a state that the detection element is exposed to the combustion chamber C.

As illustrated in FIG. 1, the intake passage 20 includes a common intake pipe 22 as a single pipe, and an intake manifold 21 formed to be branched from a downstream end of the common intake pipe 22. Each branch pipe of the intake manifold 21 is connected to the engine body 1 (the cylinder head 4) in such a manner as to communicate with each cylinder 2 via the intake port 6. A downstream end of the common intake pipe 22 is connected to a gathering portion of branch pipes of the intake manifold 21 (a portion where upstream ends of branch pipes gather). In the specification, upstream (or downstream) of the intake passage 20 indicates upstream (or downstream) in the flow direction of intake air flowing through the intake passage 20.

An air cleaner 25 for removing foreign matter contained in intake air, and a throttle valve 27 operable to open and close so as to adjust the flow rate of intake air flowing through the common intake pipe 22 are disposed on the common intake pipe 22 in this order from the upstream side. Further, an airflow sensor SN3 for detecting a flow rate of intake air flowing through the common intake pipe 22 is disposed on the downstream side of the common intake pipe 22 with respect to the throttle valve 27.

The exhaust passage 30 includes a common exhaust pipe 32 as a single pipe, and an exhaust manifold 31 formed to be branched from an upstream end of the common exhaust pipe 32. Each branch pipe of the exhaust manifold 31 is connected to the engine body 1 (the cylinder head 4) in such a manner as to communicate with each cylinder 2 via the exhaust port 7. An upstream end of the common exhaust pipe 32 is connected to a gathering portion of branch pipes of the exhaust manifold 31 (a portion where downstream ends of branch pipes gather). In the specification, upstream (or downstream) of the exhaust passage 30 indicates upstream (or downstream) in the flow direction of exhaust gas flowing through the exhaust passage 30.

A catalyst device 35, a heat exchanger 54, a condenser 51, and an exhaust shutter valve 36 are disposed in this order from the upstream side on the common exhaust pipe 32.

The catalyst device 35 is configured to purify harmful components contained in exhaust gas. The catalyst device 35 internally includes one of a three-way catalyst, an oxidation catalyst, and an NOx catalyst, or any combination thereof. The catalyst device 35 may include a filter for trapping PM contained in exhaust gas, in addition to the aforementioned catalyst.

The exhaust shutter valve 36 is disposed to open and close at a position on the downstream side of the common exhaust pipe 32 with respect to the condenser 51. The exhaust shutter valve 36 is normally kept in a fully opened state or is kept at an opening angle substantially corresponding to the fully opened state of the exhaust shutter valve 36. For instance, in a case where it is necessary to perform an operation of returning exhaust gas by the EGR device 40 (in other words, an operation of returning a part of exhaust gas flowing through the exhaust passage 30 to the intake passage 20; hereinafter, referred to as an EGR operation), the exhaust shutter valve 36 is driven toward the closing side as necessary in order to promote the EGR operation. Specifically, when the exhaust shutter valve 36 is driven toward the closing side, and the opening angle of the exhaust shutter valve 36 is reduced, the pressure of exhaust gas within the exhaust passage 30 increases, and a difference between the pressure of intake air within the intake passage 20 and the pressure of exhaust gas within the exhaust passage 30 increases. This makes it possible to accelerate an exhaust flow from the exhaust passage 30 to the intake passage 20, and to secure a sufficient EGR amount.

The condenser 51 is configured to condense steam contained in exhaust gas. The heat exchanger 54 is configured to increase the temperature of condensed water generated in the condenser 51. The heat exchanger 54 and the condenser 51 are elements constituting a part of the water supply system 50, which will be described later in detail.

The EGR device 40 includes an EGR passage 41 for communicating between the common exhaust pipe 32 and the common intake pipe 22, and an EGR valve 42 and an EGR cooler 43 disposed on the EGR passage 41.

The EGR passage 41 connects between an upstream portion of the common exhaust passage 32 with respect to the catalyst device 35, and a downstream portion of the common intake pipe 22 with respect to the throttle valve 27. The EGR valve 42 is an opening/closing valve for adjusting the flow rate of exhaust gas (EGR gas) returning from the common exhaust pipe 32 to the common intake pipe 22 through the EGR passage 41. The EGR cooler 43 is a heat exchanger for cooling EGR gas flowing through the EGR passage 41 by heat exchange with a predetermined coolant (e.g. engine cooling water).

(ii) Specific Configuration of Water Supply Device

As illustrated in FIG. 1, the water supply device 50 includes the condenser 51, the heat exchanger 54, a water tank 52 for storing condensed water generated in the condenser 51, a water feeding pump 53 for pumping out condensed water stored in the water tank 52 toward the heat exchanger 54, an accumulator rail 56 for storing high-temperature and high-pressure water which is pressurized by the water feeding pump 53 and heated by the heat exchanger 54 while keeping the water temperature and the water pressure, a first water pipe 61 for connecting between the condenser 51 and the water tank 52, a second water pipe 62 for connecting between the water tank 52 and the heat exchanger 54, a third water pipe 63 for connecting between the heat exchanger 54 and the accumulator rail 56, and a plurality of (four) distribution pipes 64 for connecting between the accumulator rail 56 and each water injection valve 12.

The condenser 51 is a heat exchanger for condensing steam contained in exhaust gas flowing through the common exhaust pipe 32. The condenser 51 condenses steam contained in exhaust gas by cooling the exhaust gas by heat exchange with a predetermined coolant (e.g. engine cooling water). Condensed water generated in the condenser 51 flows downstream through the first water pipe 61, and is stored in the water tank 52.

The water feeding pump 53 is disposed at a midway of the second water pipe 62, and is configured to feed condensed water stored in the water tank 52 toward the heat exchanger 54, while pressurizing the condensed water. Water to be pumped out from the water feeding pump 53 has a pressure of about 24 MPa and a temperature of about 80° C., for instance.

The heat exchanger 54 is configured to heat water supplied from the water feeding pump 53 by heat exchange with exhaust gas before the water flows into the condenser 51. Although detailed illustration is omitted, the heat exchanger 54 includes a small-diameter and long-shaped thin pipe 54a, which is inserted in a portion of the common exhaust pipe 32 at a position between the catalyst device 35 and the condenser 51, an insulation case of a double pipe structure, which is configured to cover the portion of the common exhaust pipe 32 where the thin pipe 54a is inserted, and a heat storage material filled in a space portion (between the outer pipe and the inner pipe) of the insulation case. Use of an insulation case filled with a heat storage material in the heat exchanger 54 as described above is advantageous in securing a water heating effect by the heat exchanger 54 to a certain level or more, regardless of a temperature change of exhaust gas depending on an operating condition of the engine.

Water heated by the heat exchanger 54 is fed downstream through the third water pipe 63, and is stored in the accumulator rail 56. A water pressure sensor SN4 for detecting a pressure of water inside the accumulator rail 56 is disposed on the accumulator rail 56.

The heat exchanger 54 has a capability of heating water to such an extent that water is brought to a supercritical state. Specifically, the temperature of water having a pressure of about 24 MPa and a temperature of about 80° C. immediately before flowing into the heat exchanger 54 is significantly increased, as the water passes through the heat exchanger 54, and the water turns to water in a supercritical state (supercritical water). Supercritical water is water in a specific state having both of properties of liquid and properties of gas (a state that water does not have any of three phases i.e. a liquid phase, a gas phase, and a solid phase) because the water has a temperature of 647 K (374° C.) or higher and a pressure of 22 MPa or higher. Supercritical water generated in the heat exchanger 54 is stored in the accumulator rail 56 while keeping the water pressure and the water temperature, and is injected into the cylinder 2 through the water injection valve 12 as necessary. Specifically, in the embodiment, supercritical water is used as water to be injected from the water injection valve 12 into the cylinder 2.

Further, supercritical water to be used in the embodiment is generated by the aforementioned process (via the water feeding pump 53 and the heat exchanger 54). Therefore, supercritical water has a relatively high density i.e. 250 kg/m$^3$ or higher. Specifically, in the embodiment, supercritical water to be injected from the water injection valve 12 is high-temperature, high-pressure, and high-density water having a temperature of 647 K or higher, a pressure of 22 MPa or higher, and a density of 250 kg/m$^3$ or higher.

Figure 3:
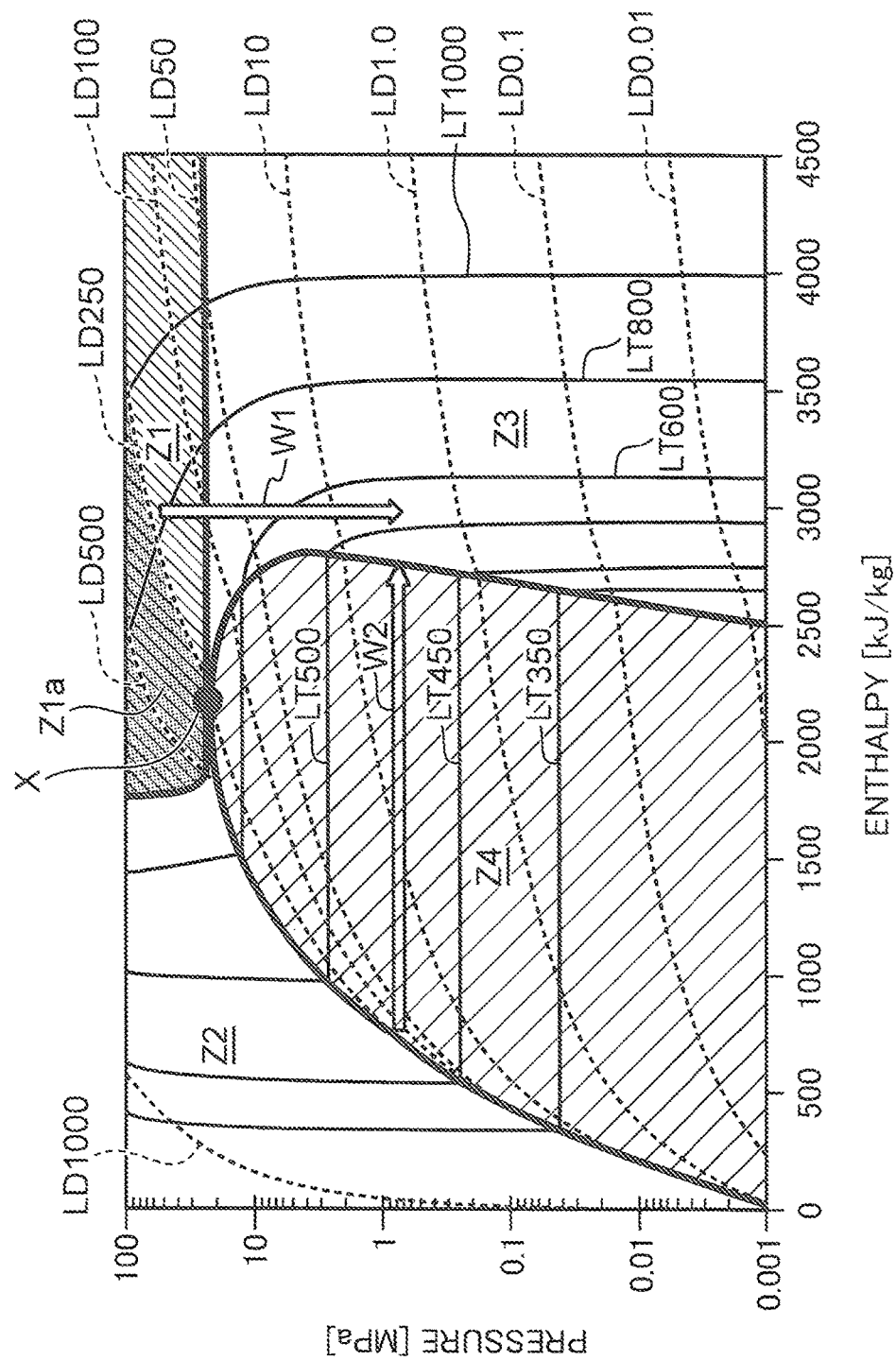
FIG. 3 is a diagram illustrating a state change of water depending on a change in enthalpy and pressure, and is a diagram for describing properties of supercritical water.

Properties of supercritical water are described with reference to FIG. 3. FIG. 3 is a diagram illustrating a state change of water depending on a change in enthalpy and pressure. In FIG. 3, the horizontal axis denotes enthalpy (kJ/kg), and the vertical axis denotes a pressure (MPa). In FIG. 3, a zone Z2 is a liquid zone, a zone Z3 is a gas zone, and a zone Z4 is a zone where liquid and gas co-exist. Solid lines LT350, LT400, . . . , and LT1000 are respectively isothermal lines. Numerals following the symbol LT respectively denote temperatures (K). For instance, LT350 is an isothermal line where the temperature is 350 K, and LT1000 is an isothermal line where the temperature is 1000 K. Broken lines LD0.01, LD0.1, . . . , and LD1000 are respectively isopycnic lines. Numerals following the symbol LD respectively denote densities (kg/m$^3$). For instance, LD0.01 is an isopycnic line where the density is 0.01 kg/m$^3$, and LD1000 is an isopycnic line where the density is 1000 kg/m$^3$.

Further, the point X in FIG. 3 is the critical point of water. The temperature of water at the critical point X is 647 K (more accurately, 647.3 K), and the pressure of water at the critical point X is 22 MPa (more accurately, 22.12 MPa). Supercritical water is water included in the zone Z1 where the temperature and the pressure are higher than those at the critical point X, in other words, water having a temperature of 647 K or higher, and a pressure of 22 MPa or higher.

Further, in FIG. 3, a zone obtained by eliminating a zone (a right-side zone with respect to the line LD250) where the density is lower than 250 kg/m$^3$ from the zone Z1 of supercritical water is defined as a zone Z1a. Water included in the zone Z1a represents supercritical water to be used in the embodiment (water having a temperature of 647 K or higher, a pressure of 22 MPa or higher, and a density of 250 kg/m$^3$ or higher).

As is comprehensible from FIG. 3, supercritical water to be used in the embodiment (water included in the zone Z1a) has a density higher than that of gaseous water (steam) included in the zone Z3. Injecting supercritical water as described above into the cylinder 2 is advantageous in supplying a large amount of water into the cylinder 2 within a short period, as compared with a case where gaseous water is injected. Further, as indicated by the arrow W1 in FIG. 3, supercritical water hardly requires enthalpy (latent heat) for turning to gaseous water. On the other hand, as indicated by the arrow W2 in FIG. 3, liquefied water included in the zone Z2 requires large enthalpy (latent heat) for turning to gas. This means that injecting supercritical water into the cylinder 2 is advantageous in suppressing temperature lowering of the cylinder 2 resulting from absorption of latent heat by water, as compared with a case where liquefied water is injected.

(iii) Control System of Engine

Figure 4:
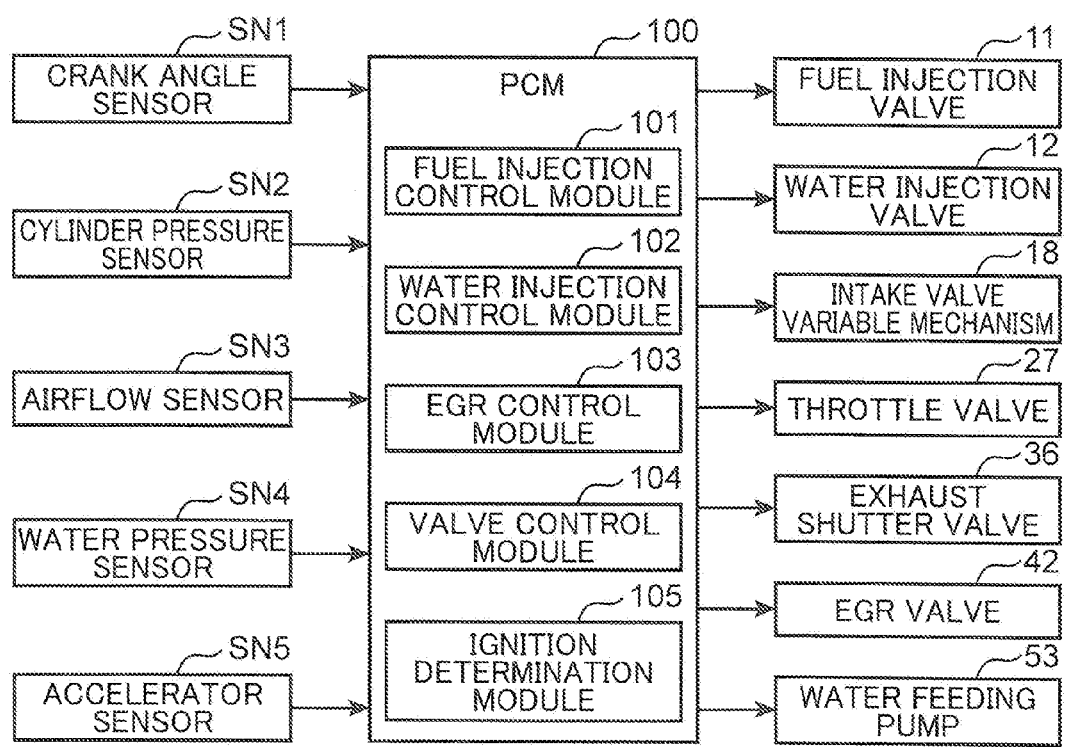
FIG. 4 is a block diagram illustrating a control system of the engine.

FIG. 4 is a block diagram illustrating a control system of the engine. A PCM 100 illustrated in FIG. 4 is a control device for integrally controlling the engine, and is a microprocessor constituted by a well-known CPU, ROM, RAM, and the like.

Detection signals by various sensors are input to the PCM 100. For instance, the PCM 100 is electrically connected to the crank angle sensor SN1, the cylinder pressure sensor SN2, the airflow sensor SN3, and the water pressure sensor SN4. Information (i.e. a crank angle, a cylinder pressure, an intake flow rate, a water pressure, etc.) detected by these sensors is successively input to the PCM 100 as an electrical signal.

Further, a vehicle includes an accelerator sensor SN5 for detecting an opening angle of an accelerator pedal (not illustrated) to be operated by a driver driving the vehicle. A detection signal by the accelerator sensor SN5 is also input to the PCM 100.

The PCM 100 controls each part of the engine while performing various determinations and calculations based on input signals from the various sensors. Specifically, the PCM 100 is electrically connected to the fuel injection valves 11, the water injection valves 12, the intake valve variable mechanisms 18, the throttle valve 27, the exhaust shutter valve 36, the EGR valve 42, the water feeding pump 53, and the like. The PCM 100 outputs signals for respectively controlling these elements based on a result of the calculation or the like.

As functional elements relating to the aforementioned control, the PCM 100 includes a fuel injection control module 101, a water injection control module 102, an EGR control module 103, a valve control module 104, and an ignition determination module 105.

The fuel injection control module 101 determines an injection amount and an injection timing of fuel from the fuel injection valve 11, based on an engine load to be specified from a detection value (an accelerator opening angle) of the accelerator sensor SN5, an engine speed detected by the crank angle sensor SN1, and an intake flow rate detected by the airflow sensor SN3; and controls the fuel injection valve 11 in accordance with the determination.

The water injection control module 102 drives the water feeding pump 53 in such a manner that an inner pressure of the accumulator rail 56 (a pressure of water stored in the accumulator rail 56) is retained at a pressure (22 MPa) or higher, which is required for supercritical water, based on the inner pressure of the accumulator rail 56 detected by the water pressure sensor SN4. Further, the water injection control module 102 determines an injection amount and an injection timing of supercritical water from the water injection valve 12, based on an injection amount of fuel from the fuel injection valve 11, and an inner pressure of the cylinder 2 (a cylinder pressure) detected by the cylinder pressure sensor SN2; and controls the water injection valve 12 in accordance with the determination.

The EGR control module 103 determines a target value of EGR rate, which is a ratio of EGR gas with respect to the total amount of gas to be introduced into the cylinder 2, based on the engine load or the like; and controls the EGR valve 42 and the exhaust shutter valve 36 in such a manner as to obtain an EGR rate equal to the target value.

The valve control module 104 increases or decreases the effective compression ratio depending on an operating condition of the engine (an engine load and an engine speed) by driving the intake valve variable mechanism 18 to variably set opening/closing characteristics (at least a closing timing) of the intake valve 8. Specifically, the valve control module 104 stores target opening/closing characteristics of the intake valve 8, which are determined in advance in such a manner that an appropriate effective compression ratio depending on an operating condition is obtained; and controls the intake valve variable mechanism 18 in such a manner that the intake valve 8 is driven in accordance with the target opening/closing characteristics. In the engine of the embodiment, in which the geometric compression ratio of each cylinder 2 is set to be not smaller than 18 but not larger than 35 (preferably, not smaller than 18 but not larger than 30), the valve control module 104 variably sets the effective compression ratio to be not smaller than 13 but not larger than 27. In particular, in a case where the geometric compression ratio is set to be not smaller than 18 but not larger than 30, the valve control module 104 variably sets the effective compression ratio to be not smaller than 13 but not larger than 23.

The ignition determination module 105 determines whether or not an air-fuel mixture is self-ignited, based on a cylinder pressure detected by the cylinder pressure SN2. Specifically, when an air-fuel mixture is self-ignited within the cylinder 2, and HCCI combustion starts, the cylinder pressure starts to rapidly increase by heat generation. The ignition determination module 105 determines whether or not the cylinder pressure rapidly increases, based on a detection value of the cylinder pressure sensor SN2 to determine whether or not an air-fuel mixture is self-ignited (in other words, combustion starts).

(iv) Control Depending on Operating Condition

Next, control of the fuel injection valve 11, the water injection valve 12, the EGR valve 42, and the exhaust shutter valve 36 by the PCM 100 is described in detail.

Figure 5:
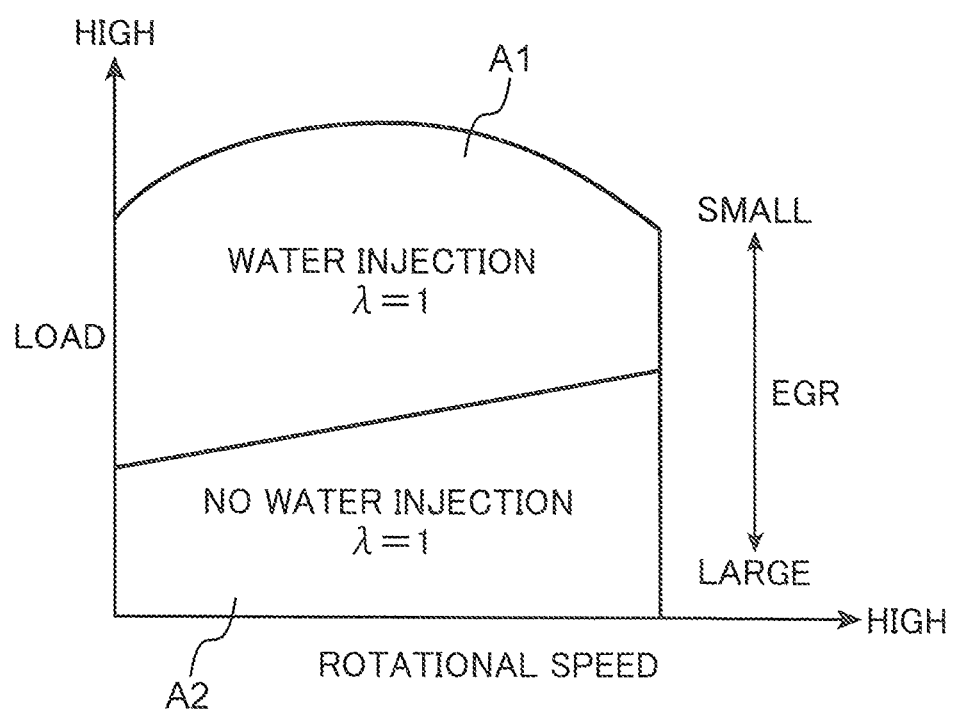
FIG. 5 is a map diagram illustrating differences in control depending on an operating condition of the engine.

FIG. 5 is a map diagram for describing differences in control depending on an operating condition of the engine (an engine load/an engine speed). As described above, in the embodiment, HCCI combustion such that an air-fuel mixture is self-ignited resulting from compression by a piston is performed in all the operating ranges of the engine. Types of HCCI combustion in the embodiment are roughly classified into HCCI combustion that accompanies injection of supercritical water from the water injection valve 12, and HCCI combustion that does not accompany injection of supercritical water from the water injection valve 12. Specifically, as illustrated in FIG. 5, in a case where an operating range of the engine is divided into a first operating range A1, and a second operating range A2 where the load is lower than that in the first operating range A1, control such that HCCI combustion is performed while injecting supercritical water from the water injection valve 12 is selected in the first operating range A1 on the high load side, and control such that HCCI combustion is performed in a state that injection of supercritical water is stopped is selected in the second operating range A2 on the low load side. Control in each of the first operating range A1 and the second operating range A2 is briefly described as follows.

(a) Control in First Operating Range

In the first operating range A1 where HCCI combustion that accompanies water injection is performed, the fuel injection valve 11 is controlled in such a manner that the injection amount of fuel increases, as the load increases. Further, the injection timing of fuel is set to a timing somewhat earlier than a target ignition timing so that an air-fuel mixture is self-ignited at an appropriate timing (e.g. in the vicinity of the compression top dead center) depending on an operating condition of the engine (an engine load/an engine speed).

The water injection valve 12 is controlled in such a manner that a large amount of supercritical water is injected, as the load increases. More specifically, the water injection valve 12 is controlled in such a manner that supercritical water of an amount proportional to the injection amount of fuel from the fuel injection valve 11 is injected. Further, the injection timing of supercritical water is set to a predetermined timing in such a manner that a rate of increase of a cylinder pressure which increases by HCCI combustion, and a maximum value of the pressure increase rate do not exceed allowable values. More specifically, in the embodiment, injection of supercritical water from the water injection valve 12 is performed twice per cycle of each cylinder 2 (e.g. see FIG. 7 to be described later). In this case, when it is assumed that the first-time injection is first water injection W1, and the second-time injection is second water injection W2, the first water injection W1 is started at a timing substantially coincident with a timing when an air-fuel mixture is self-ignited (in other words, when combustion starts), and is terminated during the combustion. The second water injection W2 is started after the first water injection W1 is terminated and before the combustion ends. Further, there is a non injection period when injection of supercritical water from the water injection valve 12 is stopped between the first water injection W1 and the second water injection W2. The first water injection W1 corresponds to a basic water injection in the claims, and the second water injection W2 corresponds to an additional water injection in the claims.

The throttle valve 27 is not specifically controlled to open and close, and is basically kept at an opening angle substantially corresponding to a fully opened state of the throttle valve 27.

The opening angles of the EGR valve 42 and the exhaust shutter valve 36 are controlled in such a manner that an excess air ratio X is equal to 1 or is about 1 in a state that the throttle valve 27 is substantially fully opened. Specifically, the opening angles of the EGR valve 42 and the exhaust shutter valve 36 are controlled in such a manner that gas to be introduced into the cylinder 2 in a case where the throttle valve 27 is fully opened is occupied by air (fresh air) equivalent to $\lambda \approx 1$ and EGR gas, in other words, in such a manner that an amount of EGR gas obtained by subtracting an amount of air equivalent to $\lambda \approx 1$ from the total amount of gas when the throttle valve 27 is fully opened is secured. The excess air ratio X is a value obtained by dividing an actual amount of air to be introduced into the cylinder 2 with an amount of air necessary for achieving a stoichiometric air-fuel ratio (an amount of air/an amount of fuel=14.7).

The injection amount of fuel increases, as the engine load increases. Therefore, the amount of air equivalent to $\lambda \approx 1$ also increases, as the engine load increases. In view of the above, it is necessary to reduce the EGR rate, which is a ratio of EGR gas with respect to the total amount of gas within the cylinder 2, as the load increases. In particular, in a part of the first operating range A1 where the load is highest (a full load line and its vicinity of the engine), the EGR rate (the EGR amount) is set to be zero in order to secure a large amount of air suitable for the load. In other words, an EGR operation itself is stopped. The opening angles of the EGR valve 42 and the exhaust shutter valve 36 are controlled in such a manner that an EGR rate (an EGR amount) that changes with the aforementioned trend is achieved.

(b) Control in Second Operating Range

In the second operating range A2 where HCCI combustion that does not accompany water injection is performed, the water injection valve 12 is kept in a closed state, and injection of supercritical water is stopped. The injection amount of fuel from the fuel injection valve 11 is controlled in such a manner that the injection amount increases, as the load increases. However, the injection amount of fuel in the second operating range A2 is small as a whole as compared with the injection amount in the first operating range A1. The opening angle of the throttle valve 27 is kept to a value corresponding to a fully opened state of the throttle valve 27. Further, the EGR valve 42 and the exhaust shutter valve 36 are controlled in such a manner that the amount of air equivalent to $\lambda \approx 1$ is secured in this state. In the second operating range A2, the fuel injection amount is smaller than that in the first operating range A1. Therefore, in order to introduce an amount of air equivalent to $\lambda \approx 1$ (in other words, an amount of air smaller than that in the second operating range A2) into the cylinder 2 so as to achieve the aforementioned condition, the EGR rate (the EGR amount) in the second operating range A2 is set to a value higher than that in the first operating range A1.

(v) Specific Control Example in First Operating Range

Figure 6:
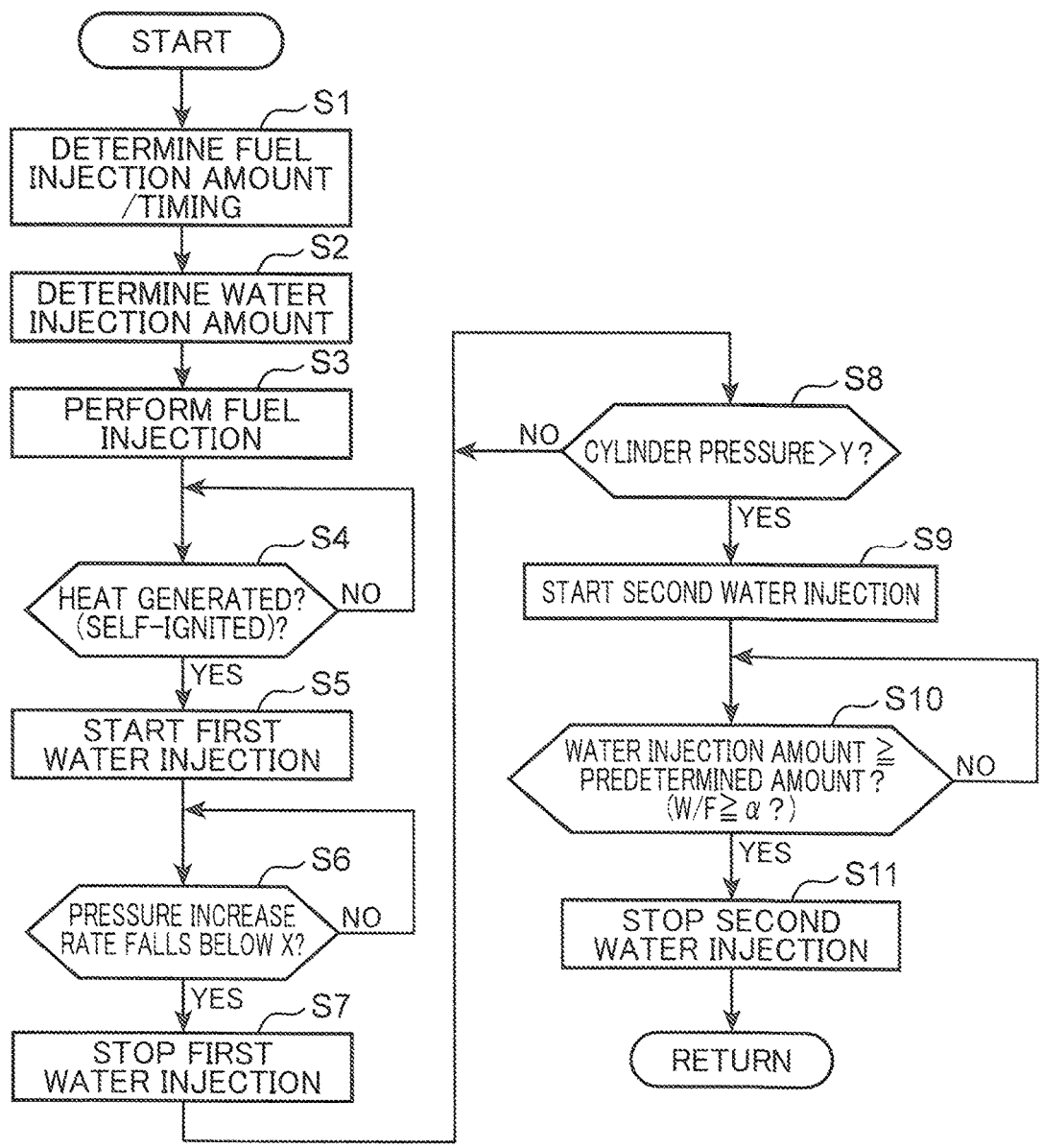
FIG. 6 is a flowchart illustrating a specific procedure of control when fuel injection and water injection are performed during an operation of the engine in a high load range.
Figure 7:
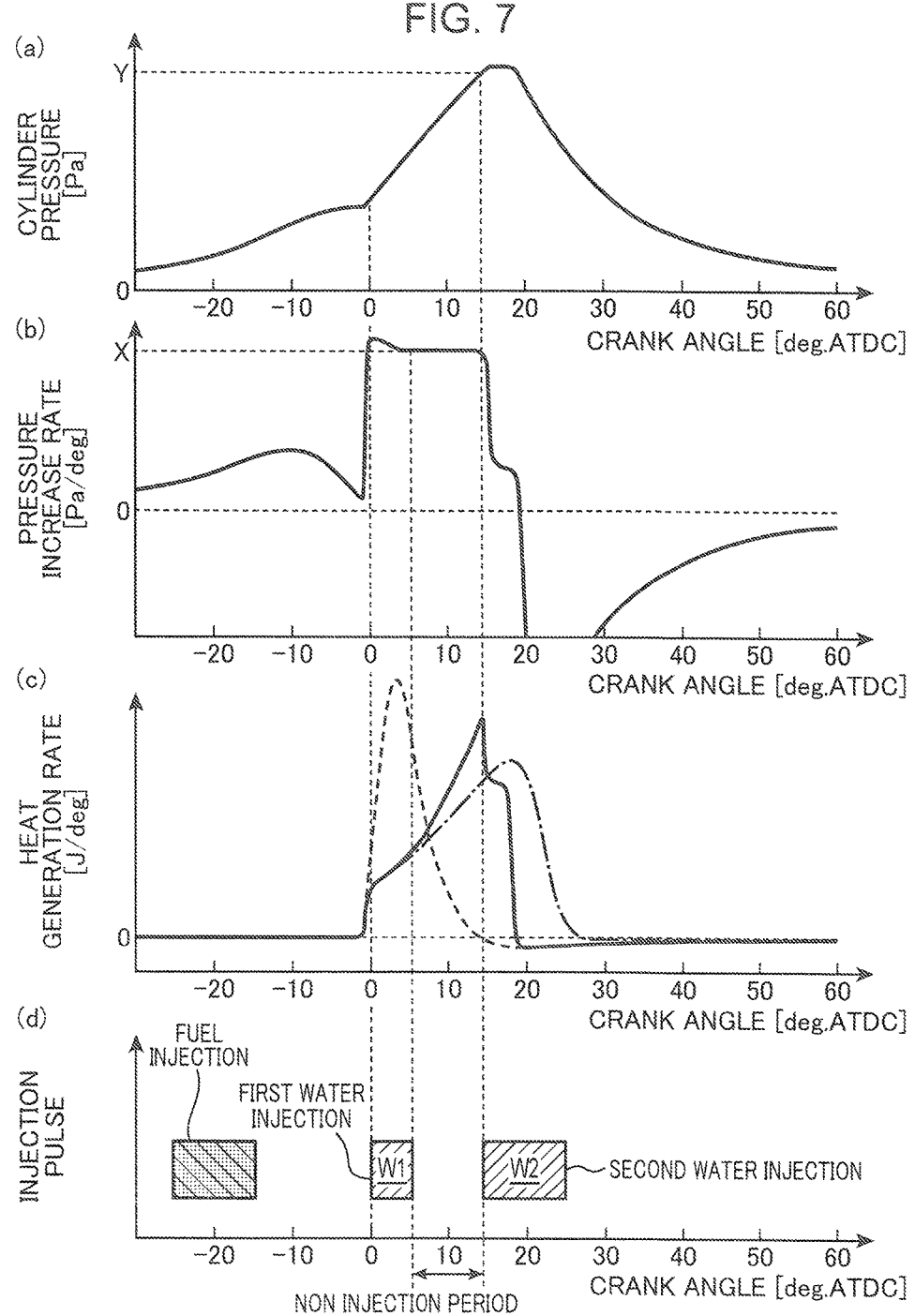
FIG. 7 is a time chart illustrating a state change of a cylinder by fuel injection and water injection.

Next, a specific control example in the first operating range A1 where HCCI combustion that accompanies water injection (mainly, control of the fuel injection valve 11 and control of the water injection valve 12) is performed is described with reference to FIG. 6 and FIG. 7. FIG. 6 is a flowchart illustrating a specific procedure of control of the fuel injection valve 11 and control of the water injection valve 12 to be performed in the first operating range A1. FIG. 7 is a time chart illustrating a state change of the cylinder 2 by fuel injection and water injection in the first operating range A1. Specifically, in FIG. 7, the chart (a) indicates a change of a cylinder pressure (Pa) with respect to a crank angle, the chart (b) indicates a change of a rate of increase (Pa/deg) of a cylinder pressure with respect to a crank angle, the chart (c) indicates a change of a heat generation rate (J/deg) with respect to a crank angle, and the chart (d) indicates an injection pulse of fuel and an injection pulse of water, respectively. In FIG. 7, the crank angle on the horizontal axis denotes a crank angle (deg. ATDC), assuming that the crank angle is 0° when the piston is at the compression top dead center.

When the control illustrated in the flowchart of FIG. 6 is started, the fuel injection control module 101 determines an injection amount and an injection timing of fuel from the fuel injection valve 11 (Step S1). Specifically, the fuel injection control module 101 acquires an engine load, an engine speed, and an intake flow rate from detection values of the accelerator sensor SN5, the crank angle sensor SN1, and the airflow sensor SN3; and determines an injection amount and an injection timing of fuel from the fuel injection valve 11, based on the acquired values.

As described above, the injection amount of fuel from the fuel injection valve 11 is determined to increase, as the engine load increases. Further, the injection timing of fuel is determined to be a timing taking into consideration an estimated ignition delay time so that a mixture of injected fuel and air is self-ignited at a predetermined target ignition timing. In this example, a target ignition timing of an air-fuel mixture is typically set in the vicinity of the compression top dead center. An ignition delay time (a period from injection to ignition) is estimated and calculated based on an injection amount of fuel, an intake flow rate, an engine speed, and the like with respect to the target ignition timing; and a timing earlier than the target ignition timing by the calculated ignition delay time is determined as an injection timing of fuel. The target ignition timing is not limited to the vicinity of the compression top dead center, and may be advanced or retarded with respect to the compression top dead center to a certain extent depending on an operating condition of the engine. In any of the cases, the target ignition timing is set to be included in one of a latter stage of a compression stroke and an initial stage of an expansion stroke. In this example, a latter stage of a compression stroke is a range from 60° degrees CA before the compression top dead center (BTDC) to the compression top dead center, and an initial stage of an expansion stroke is a range from the compression top dead center to 60° CA after the compression top dead center (ATDC). Specifically, in the embodiment, an injection timing of fuel from the fuel injection valve 11 is determined to be such a timing that an air-fuel mixture is self-ignited in a latter stage of a compression stroke or in an initial stage of an expansion stroke (60° CA BTDC to 60° CA ATDC).

Next, in Step S2, the water injection control module 102 determines the injection amount of supercritical water from the water injection valve 12, based on the injection amount of fuel determined in Step S1. Specifically, in the embodiment, the injection amount of supercritical water from the water injection valve 12 (the mass of water to be injected per cycle) is determined in advance to be a predetermined ratio with respect to the injection amount of fuel from the fuel injection valve 11 (the mass of fuel to be injected per cycle). Specifically, in Step S2, the injection amount of supercritical water from the water injection valve 12 is determined by multiplying the aforementioned ratio (hereinafter, referred to as a water-to-fuel ratio α) with the injection amount of fuel determined in Step S1. The water-to-fuel ratio α is set to be a value, which is not smaller than 3 but not larger than 6, for instance. Specifically, in the embodiment, supercritical water of an amount three to six times as large as the injection amount of fuel is supplied to each cylinder 2 when HCCI combustion that accompanies water injection is performed (during an operation in the first operating range A1).

Next, the fuel injection control module 101 controls to inject fuel from the fuel injection valve 11 (Step S3). Specifically, the fuel injection control module 101 controls an opening operation of the fuel injection valve 11 in such a manner that fuel of an amount equal to the injection amount determined in Step S1 is injected from the fuel injection valve 11, and the injection timing of fuel coincides with the injection timing determined in Step S1. The chart (d) of FIG. 7 illustrates an example, in which fuel is injected from the fuel injection valve 11 in a certain period including 20° CA BTDC.

Subsequently, the ignition determination module 105 determines whether or not heat is generated by combustion (Step S4). Specifically, fuel injected in Step S3 is self-ignited after a predetermined ignition delay time while being mixed with air within the cylinder 2, whereby combustion (HCCI combustion) starts. Then, a cylinder pressure starts to rapidly increase by heat generation by the combustion. The ignition determination module 105 recognizes the rapid increase in the cylinder pressure, based on a detection value of the cylinder pressure sensor SN2, and determines that heat is generated (in other words, an air-fuel mixture is self-ignited) at the time of recognition of the rapid increase in the cylinder pressure. The timing of self-ignition of an air-fuel mixture to be specified as described above (start of HCCI combustion) corresponds to a timing when a hot flame reaction starts, more specifically, a timing when combustion of 5 to 15% by mass of fuel to be injected from the fuel injection valve 11 per cycle is completed.

In a case where a determination result in Step S4 is YES, and it is confirmed that heat is generated (an air-fuel mixture is self-ignited), the water injection control module 102 starts first water injection W1 by opening the water injection valve 12 (Step S5). In the example illustrated in FIG. 7, an air-fuel mixture is self-ignited in the vicinity of the compression top dead center (0° CA), and a cylinder pressure, a rate of increase of a cylinder pressure, and a heat generation rate respectively start to rapidly increase by the self-ignition. In this case, the first water injection W1 is started in the vicinity of the compression top dead center, which is a timing substantially coincident with self-ignition.

After the first water injection W1 is started, the water injection control module 102 determines whether or not a rate of increase of a cylinder pressure is lowered below a predetermined threshold value X (Step S6). Specifically, the water injection control module 102 checks a pressure increase rate (Pa/deg), which is a rate of increase of a cylinder pressure with respect to a crank angle, based on a cylinder pressure detected by the cylinder pressure sensor SN2 after the first water injection W1 is started, and specifies that the pressure increase rate shifts from a rising trend to a falling trend. Then, the water injection control module 102 determines whether or not the pressure increase rate is lowered below the threshold value X (e.g. 470 kPa/deg) after the pressure increase rate shifts to a falling trend.

In a case where a determination result in Step S6 is YES, and it is confirmed that a pressure increase rate is lowered below the threshold value X, the water injection control module 102 stops the first water injection W1 by closing the water injection valve 12 (Step S7). In the example illustrated in FIG. 7, a pressure increase rate is lowered below the threshold value X in the vicinity of 5° CA ATDC (see the chart (b)), and the first water injection W1 is stopped at the point of time when the pressure increase rate is lowered below the threshold value X.

After the first water injection W1 is stopped, the water injection control module 102 determines whether or not a cylinder pressure exceeds a predetermined threshold value Y (Step S8). Specifically, the water injection control module 102 checks a cylinder pressure detected by the cylinder pressure sensor SN2 after the first water injection W1 is stopped, and determines whether or not the value of the cylinder pressure is higher than the threshold value Y (e.g. 12.5 MPa). The threshold value Y to be used in this example is set in advance, taking into consideration reliability of the main components of the engine body 1 (e.g. the piston 5, the cylinder head 4, etc.). A timing when a cylinder pressure reaches the threshold value Y differs depending on the effective compression ratio of the engine. In a case where the effective compression ratio is set to be not smaller than 13 but not larger than 27 as described in the embodiment, the aforementioned timing corresponds to a point of time when combustion of 40 to 95% by mass of fuel to be injected per cycle is completed. In particular, in a case where the effective compression ratio is set to be not smaller than 13 but not larger than 23, the aforementioned timing when a cylinder pressure reaches the threshold value Y corresponds to a point of time when combustion of 50 to 95% by mass of fuel is completed.

In a case where a determination result in Step S8 is YES, and it is confirmed that a cylinder pressure exceeds the threshold value Y, the water injection control module 102 starts second water injection W2 by opening the water injection valve 12 (Step S9). In the example illustrated in FIG. 7, a cylinder pressure exceeds the threshold value Y in the vicinity of 15° CA ATDC (see the chart (a)), and the second water injection W2 is started at the point of time when a cylinder pressure exceeds the threshold value Y. Further, as illustrated in the chart (d) of FIG. 7, the second water injection W2 is started at a point of time after lapse of a predetermined period from stopping of the first water injection W1. In other words, there is a non injection period when water is not injected between the first water injection W1 and the second water injection W2.

After the second water injection W2 is started, the water injection control module 102 determines whether or not the total injection amount (mass) of supercritical water, which is a sum of the first water injection W1 and the second water injection W2, has reached the water injection amount determined in Step S2, in other words, has reached a mass equal to α times as large as the injection amount of fuel (Step S10).

In a case where a determination result in Step S10 is YES, and it is confirmed that the water injection amount has reached a predetermined amount (an amount a times as large as the injection amount of fuel), the water injection control module 102 stops the second water injection W2 by closing the water injection valve 12 (Step S11). In the example illustrated in FIG. 7, combustion ends (in other words, combustion of almost 100% by mass of injected fuel is completed) in the vicinity of 20° CA ATDC. However, the second water injection W2 is continued for a certain period after the combustion ends.

(vi) Advantageous Effects

As described above, the engine of the first embodiment includes the fuel injection valve 11 for injecting fuel into the cylinder 2, and the water injection valve 12 for injecting supercritical water into the cylinder 2. When the engine is operated in the first operating range A1 on the high load side, the water injection valve 12 performs, during a cylinder cycle, first water injection W1, which is started substantially concurrently with self-ignition of an air-fuel mixture (start of HCCI combustion) and is terminated during the combustion, and second water injection W2, which is started after the first water injection W1 is terminated and before combustion ends. Further, there is a non injection period when water is not injected between the first water injection W1 and the second water injection W2. The aforementioned configuration is advantageous in suppressing an increase in the cylinder pressure, while securing an output torque of the engine.

Specifically, in the first embodiment, the first water injection W1 is started substantially concurrently with self-ignition of an air-fuel mixture to supply water into the cylinder 2. Therefore, it is possible to suppress progress of combustion (HCCI combustion) immediately after self-ignition by the existence of water, which is an inert substance that does not react with a fuel component. This makes it possible to avoid a rapid increase in the cylinder pressure immediately after self-ignition, and to suppress an increase of combustion noise by the rapid increase in the cylinder pressure (an increase in a pressure increase rate). For instance, as illustrated by the broken waveform in the chart (c) of FIG. 7, when it is assumed that the first water injection W1 is not performed, combustion may rapidly progress immediately after self-ignition, a large amount of heat may be generated in a short period, and a cylinder pressure may rapidly increase by the heat generation. This may lead to an increase in a pressure increase rate, which is correlated to combustion noise, in other words, may lead to an increase of combustion noise. This may lower the commercial value of the engine. On the other hand, in the first embodiment, in which water (supercritical water) is injected from the water injection valve 12 substantially concurrently with self-ignition, it is possible to suppress an increase in the cylinder pressure (a pressure increase rate) by injected water. This makes it possible to suppress an increase of combustion noise, and to enhance the commercial value of the engine.

Further, second water injection W2 is started after the first water injection W1 is terminated and before combustion ends. This makes it possible to suppress progress of combustion after the first water injection W1 is terminated, and an increase in the cylinder pressure resulting from the progress of the combustion, by the second water injection W2; and to avoid a situation such that the maximum value of a cylinder pressure excessively increases (e.g. over an allowable value in terms of design). This is advantageous in avoiding a situation such that components such as the piston 5 and the cylinder head 4 are damaged by excessive application of a pressure to the components, and in securing reliability of the engine (the engine body 1).

Further, there is a non injection period when water is not injected between the first water injection W1 and the second water injection W2. Therefore, it is possible to avoid excessively suppressing progress of combustion and thereby to avoid a situation such that a combustion centroid (in other words, a timing when combustion of 50% by mass of fuel to be injected per cycle is completed) excessively shifts to the retard side. This makes it possible to efficiently transfer combustion energy to the piston 5 for conversion to a torque. This is advantageous in sufficiently securing an output torque of the engine without particularly increasing the injection amount of fuel, and to improve fuel economy.

Further, in the first embodiment, the first water injection W1 is started at a point of time when self-ignition of an air-fuel mixture (start of combustion) is specified based on a detection value of the cylinder pressure sensor SN2, in other words, at a point of time when it is confirmed that a cylinder pressure detected by the cylinder pressure sensor SN2 starts to rapidly increase after fuel injection. This makes it possible to start the first water injection W1 without a delay in association with self-ignition of an air-fuel mixture. This is advantageous in suppressing a rapid increase in the cylinder pressure immediately after self-ignition, and an increase of combustion noise by the rapid increase in the cylinder pressure. Further, water is not injected before self-ignition. This is advantageous in preventing a situation such that a timing of self-ignition is delayed by water injection.

Further, in the first embodiment, after the first water injection W1 is terminated, the second water injection W2 is started at a point of time when a detection pressure by the cylinder pressure sensor SN2 exceeds the threshold value Y. This makes it possible to securely start the second water injection W2 before the cylinder pressure increases to such a level that may affect reliability of the engine. This is advantageous in suppressing the maximum value of a cylinder pressure to an appropriate level by the second water injection W2.

Further, in the first embodiment, water to be injected from the water injection valve 12 into the cylinder 2 is supercritical water. Therefore, as compared with a case where gaseous water (steam) having a low density is injected, it is possible to supply a large amount of water into the cylinder 2 within a short period, and to efficiently supply a sufficient amount of water that enables to appropriately suppress an increase in the cylinder pressure into the cylinder 2. Further, as compared with a case where liquefied water is injected, the aforementioned configuration is advantageous in significantly suppressing temperature lowering of the cylinder 2 resulting from absorption of latent heat by water, and in suppressing lowering of an output torque of the engine due to the temperature lowering. Furthermore, supercritical water injected into the cylinder not only makes combustion redundant, but also keeps a cylinder pressure in an expansion stroke to a relatively high value by expansion of the supercritical water to thereby increase the work of pushing down the piston 5. Therefore, the first embodiment in which supercritical water having the aforementioned properties is injected into the cylinder 2 makes it possible to sufficiently secure an output torque of the engine, while efficiently suppressing an increase in the cylinder pressure.

Further, in the first embodiment, the engine includes the condenser 51 for condensing steam contained in exhaust gas discharged from the cylinder 2 to generate condensed water, and the heat exchanger 54 for increasing the temperature of condensed water by heat exchange with exhaust gas before the exhaust gas flows into the condenser 51. Further, supercritical water generated via a temperature increasing process by the heat exchanger 54 is injected from the water injection valve 12. Therefore, it is possible to efficiently generate supercritical water by using heat recovered from exhaust gas (without adding a dedicated heat source), and to efficiently convert heat recovered from exhaust gas to work by expanding the supercritical water generated as described above through injection into the cylinder 2. This is advantageous in improving fuel economy of the engine, while sufficiently securing an output torque of the engine.

(vii) Modifications

In the first embodiment, the cylinder pressure sensor SN2 for detecting an inner pressure of the cylinder 2 is disposed in each cylinder 2 of the engine body 1, and a timing of water injection from the water injection valve 12 is determined, based on a detection value of the cylinder pressure sensor SN2, in other words, based on an actual measurement value of a cylinder pressure. In the present invention, a cylinder pressure sensor is not an essential element, and a cylinder pressure sensor may be omitted.

In a case where a cylinder pressure sensor is omitted, for instance, it is possible to determine a timing when the first water injection W1 is started to be coincident with a predetermined target ignition timing for each operating condition. Further, it is possible to determine a timing when the second water injection W2 is started, based on an estimated value of a cylinder pressure to be calculated from an effective compression ratio, an intake flow rate, an intake temperature, an intake pressure, and a fuel injection amount at each point of time during an operation, for instance. In the first embodiment, a sensor for detecting an intake pressure and an intake temperature is not specifically mentioned. However, such a sensor is widely employed in a vehicular engine. Therefore, it is possible to estimate and calculate a cylinder pressure as described above, without adding a dedicated sensor.

Further, in the first embodiment, the excess air ratio λ is set to 1 or is set to about 1 in all the operating ranges of the engine by increasing or decreasing the EGR amount depending on a load, while keeping the opening angle of the throttle valve 27 to an angle corresponding to a fully opened state of the throttle valve 27. Alternatively, for instance, in the second operating range A2 where the load is relatively low, it is possible to operate the engine at a lean air-fuel ratio such that the excess air ratio λ is larger than 1 by sufficiently increasing the ratio of air (fresh air) with respect to the total amount of gas to be introduced into the cylinder 2 (in other words, by reducing the EGR amount).

(2) Second Embodiment

In the first embodiment, during an operation in the first operating range A1 on the high load side, two-times water injections (first water injection W1 and second water injection W2) are performed individually within a cycle in a state that a non injection period is provided between the two-times water injections. Water injection in the first operating range A1 may be a single continued injection. An example of the aforementioned configuration is described in the second embodiment as follows. In the second embodiment, the configuration other than the control relating to water injection is basically the same as in the first embodiment. Therefore, in the following, only the control relating to water injection is described.

Figure 8:
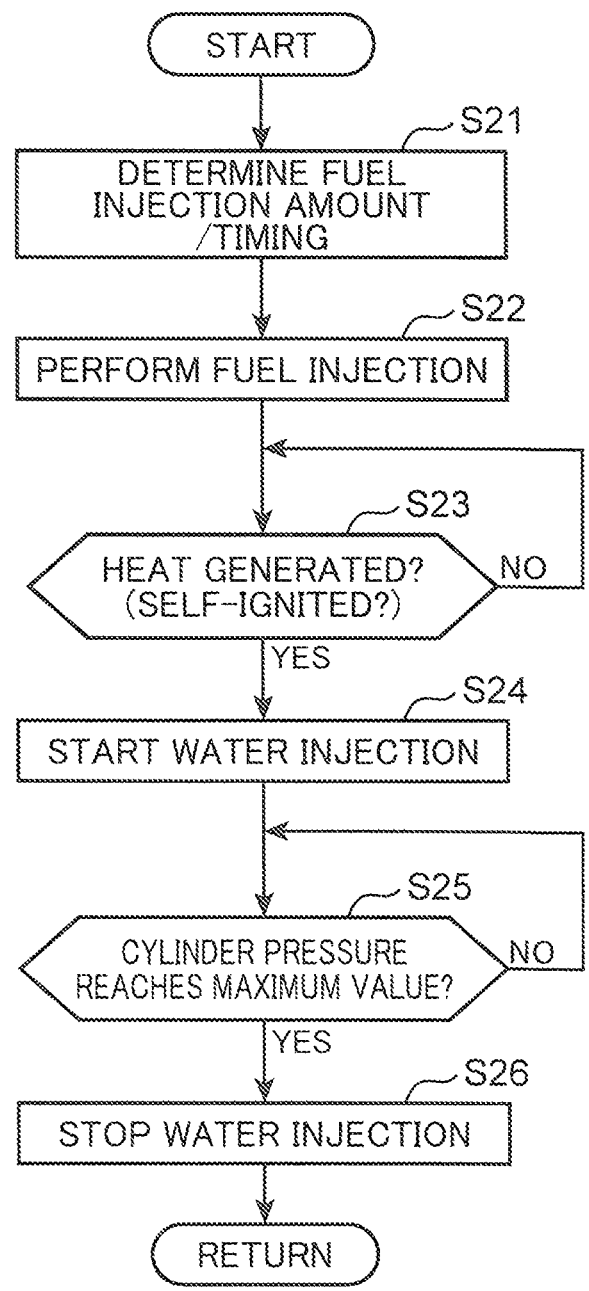
FIG. 8 is a diagram corresponding to FIG. 6 for describing a second embodiment of the present invention.
Figure 9:
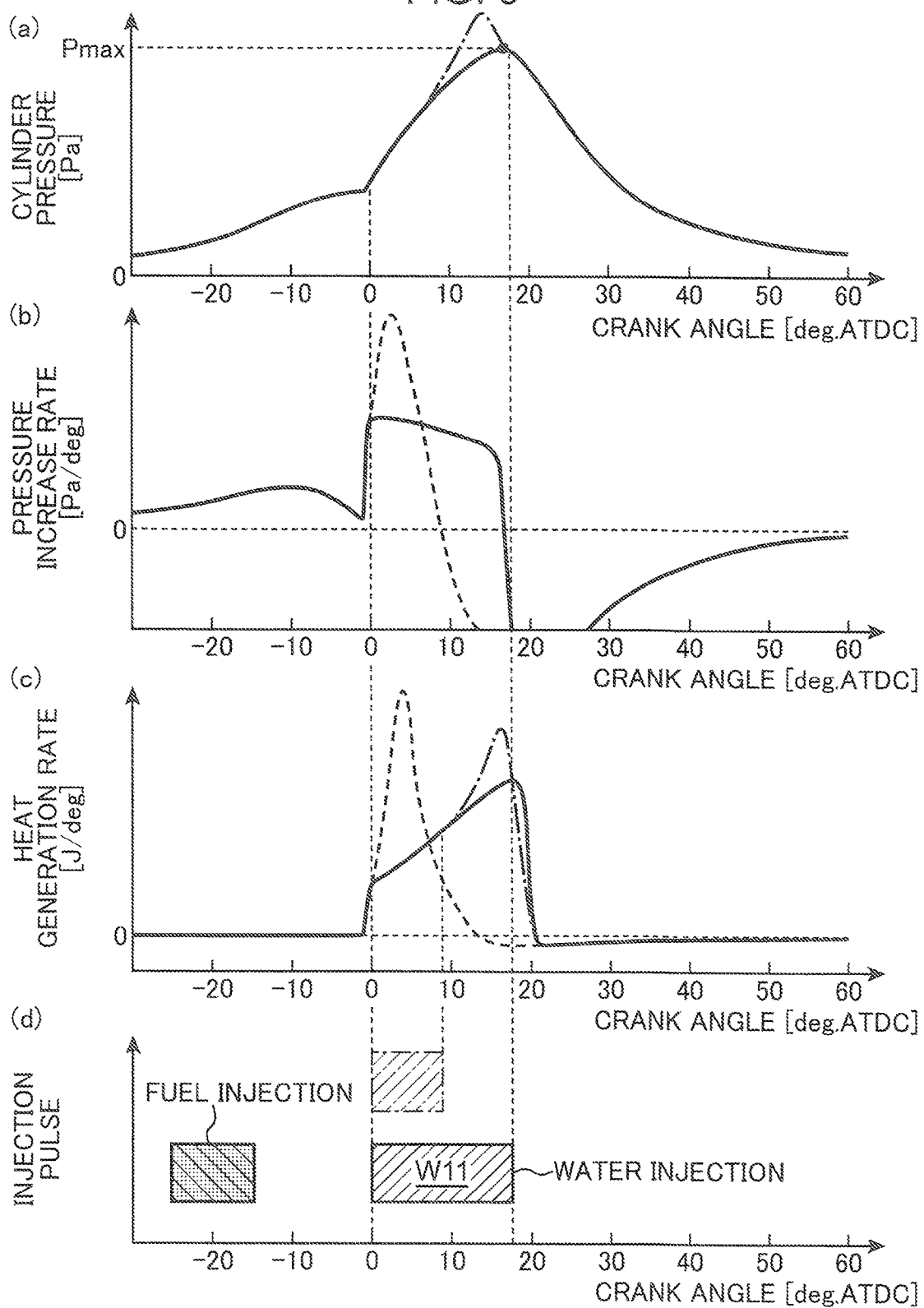
FIG. 9 is a diagram corresponding to FIG. 7 for describing the second embodiment of the present invention.

FIG. 8 and FIG. 9 are diagrams illustrating a control example in the first operating range A1 to be employed in the second embodiment. FIG. 8 and FIG. 9 respectively correspond to FIG. 6 and FIG. 7 of the first embodiment. In the second embodiment, a water injection valve 12 is controlled in such a manner that supercritical water is continuously injected during a period from a point of time when an air-fuel mixture is self-ignited (in other words, a point of time when combustion starts) until a point of time when a cylinder pressure reaches a maximum value during the combustion. Specifically, injection of supercritical water from the water injection valve 12 (water injection W11 illustrated in FIG. 9) is started at a timing substantially coincident with self-ignition of an air-fuel mixture (start of combustion), and is terminated substantially concurrently when a cylinder pressure reaches a maximum value during the combustion. The water injection W11 in the second embodiment corresponds to a basic water injection in the claims.

A specific control procedure for performing the water injection W11 is described with reference to FIG. 8. When the control illustrated in the flowchart is started, a fuel injection control module 101 determines an injection amount and an injection timing of fuel from a fuel injection valve 11 (Step S21). Specifically, the fuel injection control module 101 acquires an engine load, an engine speed, and an intake flow rate from detection values of an accelerator sensor SN5, a crank angle sensor SN1, and an airflow sensor SN3; and determines an injection amount and an injection timing of fuel from the fuel injection valve 11, based on the acquired values.

The injection amount and the injection timing of fuel are determined in the same manner as in the first embodiment. Specifically, an injection amount of fuel from the fuel injection valve 11 is determined to increase, as the engine load increases. Further, an injection timing of fuel is determined to be such a timing that a mixture of injected fuel and air is self-ignited in the vicinity of the compression top dead center (at least at a timing included in one of a latter stage of a compression stroke and an initial stage of an expansion stroke).

Subsequently, the fuel injection control module 101 controls to inject fuel from the fuel injection valve 11 (Step S22). Specifically, the fuel injection control module 101 controls an opening operation of the fuel injection valve 11 in such a manner that fuel of an amount equal to the injection amount determined in Step S21 is injected from the fuel injection valve 11, and an injection timing of fuel coincides with the injection timing determined in Step S21. The chart (d) of FIG. 9 illustrates an example, in which fuel is injected from the fuel injection valve 11 during a certain period including 20° CA BTDC.

Subsequently, an ignition determination module 105 determines whether or not heat is generated by combustion (Step S23). Specifically, fuel injected in Step S22 is self-ignited after a predetermined ignition delay time, while being mixed with air within the cylinder 2, whereby combustion (HCCI combustion) starts. Then, a cylinder pressure starts to rapidly increase by heat generation by the combustion. The ignition determination module 105 recognizes the rapid increase in the cylinder pressure, based on a detection value of the cylinder pressure sensor SN2, and determines that heat is generated (in other words, an air-fuel mixture is self-ignited) at the time of recognition of the rapid increase in the cylinder pressure. The timing of self-ignition of an air-fuel mixture to be specified as described above (start of HCCI combustion) corresponds to a timing when a hot flame reaction starts, more specifically, a timing when combustion of 5 to 15% by mass of fuel to be injected from the fuel injection valve 11 per cycle is completed.

In a case where a determination result in Step S23 is YES, and it is confirmed that heat is generated (an air-fuel mixture is self-ignited), a water injection control module 102 starts water injection W11 by opening the water injection valve 12 (Step S24). In the example illustrated in FIG. 9, an air-fuel mixture is self-ignited in the vicinity of the compression top dead center (0° CA); and a cylinder pressure, a pressure increase rate, and a heat generation rate respectively start to rapidly increase by the self-ignition. In this case, the water injection W11 is started in the vicinity of the compression top dead center, which is a timing substantially coincident with self-ignition.

Subsequently, the water injection control module 102 determines whether or not a cylinder pressure reaches a maximum value (Step S25). Specifically, the water injection control module 102 checks a change in the cylinder pressure detected by the cylinder pressure sensor SN2 after the water injection W11 is started, and specifies that the cylinder pressure shifts from a rising trend to a falling trend. Then, the water injection control module 102 determines that a cylinder pressure reaches a maximum value (Pmax illustrated in the chart (a) of FIG. 9) at a point of time when it is specified that the change in the cylinder pressure shifts to a falling trend. A timing when a cylinder pressure has reached the maximum value Pmax differs depending on the effective compression ratio of the engine. In a case where the effective compression ratio is set to be not smaller than 13 but not larger than 27 as described in the embodiment, the aforementioned timing corresponds to a point of time when combustion of 40 to 95% by mass of fuel to be injected per cycle is completed. In particular, in a case where the effective compression ratio is set to be not smaller than 13 but not larger than 23, the aforementioned timing when a cylinder pressure reaches the maximum value Pmax corresponds to a point of time when combustion of 50 to 95% by mass of fuel is completed.

In a case where a determination result in Step S25 is YES, and it is confirmed that a cylinder pressure reaches a maximum value, the water injection control module 102 stops the water injection W11 by closing the water injection valve 12 (Step S26). In the example illustrated in FIG. 9, a cylinder pressure reaches the maximum value Pmax slightly before 20° CA ATDC (see the chart (a)), and the water injection W11 is stopped at the point of time when the cylinder pressure reaches the maximum value Pmax.

As described above, in the second embodiment, during an operation in the first operating range A1 on the high load side, supercritical water is continuously injected from the water injection valve 12 during a period from a point of time when combustion by self-ignition of an air-fuel mixture (HCCI combustion) starts until a point of time when a cylinder pressure reaches the maximum value Pmax during the combustion. The aforementioned configuration is advantageous in suppressing an increase in the cylinder pressure while securing an output torque of the engine.

Specifically, in the second embodiment, injection of supercritical water from the water injection valve 12 (water injection W11) is started substantially concurrently with self-ignition of an air-fuel mixture. Therefore, it is possible to suppress progress of combustion (HCCI combustion) immediately after self-ignition by the existence of water, which is an inert substance that does not react with a fuel component. This makes it possible to avoid a rapid increase in the cylinder pressure immediately after self-ignition, and to suppress an increase of combustion noise by the rapid increase in the cylinder pressure (an increase in a pressure increase rate). For instance, as illustrated by the broken waveform in the charts (b) and (c) of FIG. 9, when it is assumed that the water injection W11 is not performed, combustion may rapidly progress immediately after self-ignition, a large amount of heat may be generated in a short period, and a cylinder pressure may rapidly increase by the heat generation. On the other hand, in the second embodiment, in which water injection is started substantially concurrently with self-ignition, it is possible to suppress an increase in the cylinder pressure (a pressure increase rate) by injected water. This makes it possible to suppress an increase of combustion noise, and to enhance the commercial value of the engine.

Further, the water injection W11 is continued until a point of time when a cylinder pressure reaches the maximum value Pmax during combustion. Therefore, it is possible to avoid a situation such that the maximum value Pmax of a cylinder pressure excessively increases (e.g. over an allowable value in terms of design) by the action of continuously injected water. For instance, as illustrated by the one-dotted chain line block in the chart (d) of FIG. 9, when it is assumed that water injection is terminated before a cylinder pressure reaches the maximum value Pmax, as illustrated by the one-dotted chain line waveform in the charts (a) and (c) of FIG. 9, progress of combustion may be accelerated immediately after water injection is stopped, and as a result, a cylinder pressure may exceed an allowable value. On the other hand, according to the second embodiment, in which water injection is continued until a cylinder pressure reaches the maximum value Pmax, it is possible to suppress the maximum value Pmax of the cylinder pressure to an appropriate level such that the cylinder pressure does not exceed an allowable value. This is advantageous in avoiding a situation such that components such as a piston 5 and a cylinder head 4 are damaged by excessive application of a pressure to the components, and in securing reliability of the engine (an engine body 1).

In the second embodiment, the water injection W11 is started at a point of time when combustion by self-ignition of an air-fuel mixture starts, and the water injection W11 is stopped at a point of time when a cylinder pressure reaches the maximum value Pmax during the combustion. Alternatively, a period when the water injection W11 is continued may be at least a continued period which starts concurrently with or after start of combustion, and which overlaps a combustion period. In view of the above, the water injection W11 may be started at a point of time slightly retarded from start of combustion (self-ignition of an air-fuel mixture), or may be stopped at a point of time slightly later than a point of time when a cylinder pressure reaches the maximum value Pmax.

For instance, in a case where the water injection W11 is continued after a cylinder pressure reaches the maximum value Pmax, a timing when the water injection W11 is stopped may be a timing when injection of supercritical water of a predetermined amount is finished. A study by the inventors of the present application reveals that in a case where supercritical water generated by recovery of heat from exhaust gas as described in the embodiment is injected into the cylinder 2, the injection amount of supercritical water, which is appropriate for improving fuel economy and for securing an output torque, is three to six times as large as the injection amount of fuel (the mass of fuel to be injected per cycle). In view of the above, the water injection W11 may be stopped at a point of time when injection of supercritical water of an amount three to six times as large as the injection amount of fuel is completed.

(3) Other Embodiments

Figure 10:
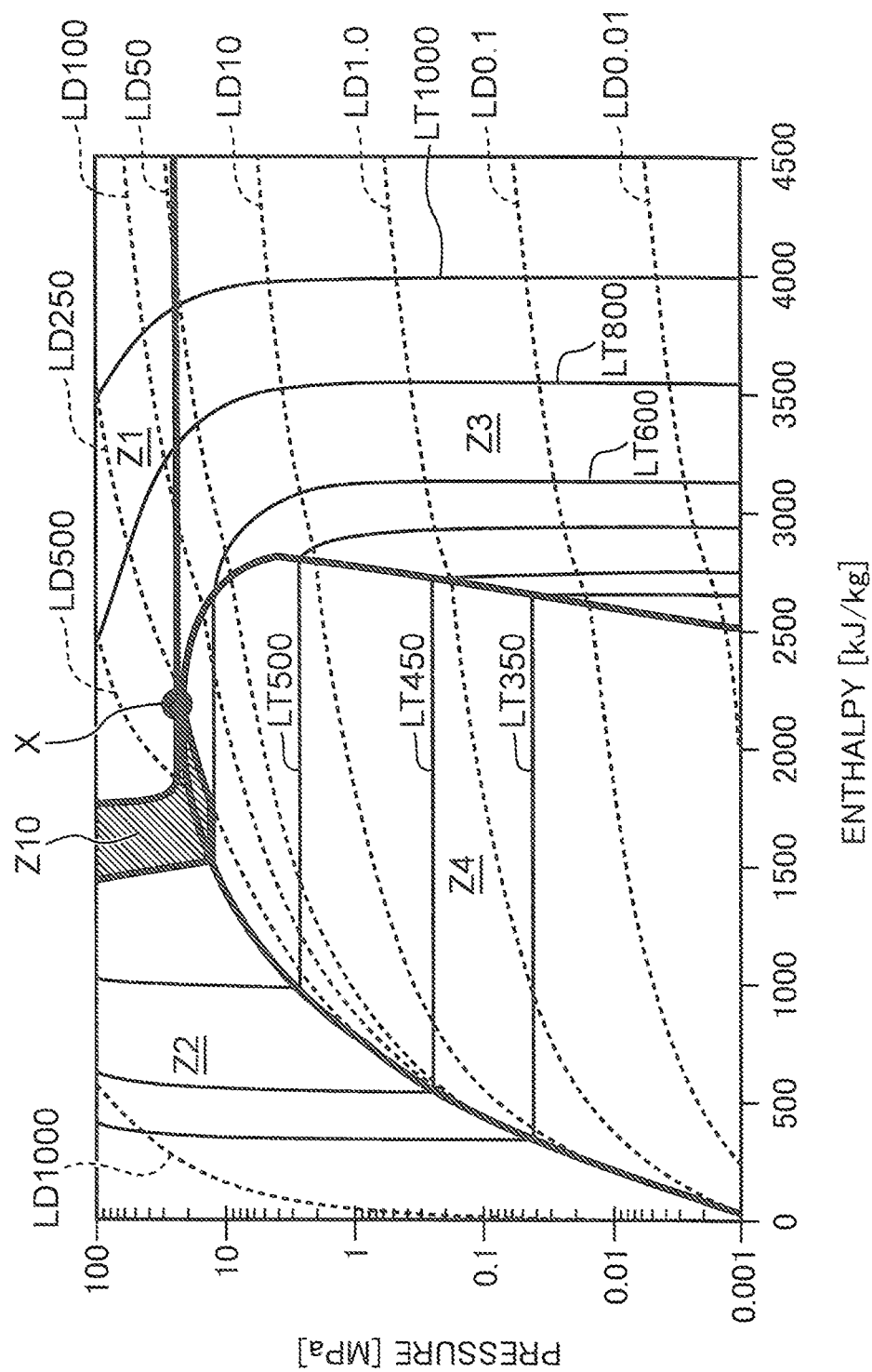
FIG. 10 is a diagram corresponding to FIG. 3 for describing subcritical water.

In the first and second embodiments, supercritical water of a relatively high density (water included in the zone Z1a in FIG. 5) having a temperature of 647 K or higher, a pressure of 22 MPa or higher, and a density of 250 kg/m$^3$ or higher is used as water to be injected from the water injection valve 12 into the cylinder 2. Alternatively, subcritical water having properties similar to those of supercritical water may be used. For instance, it is possible to use water included in a zone Z10 illustrated in FIG. 10, in other words, water having a temperature of not lower than 600 K but lower than 647 K, and a density of 250 kg/m$^3$ or higher, as subcritical water. Properties of subcritical water are similar to those of supercritical water in a point that the density is higher than that of steam and the latent heat is significantly low. In a case where subcritical water having the aforementioned properties is injected, it is also possible to suppress an increase in the cylinder pressure, while securing an output torque of the engine.

Further, in a case where supercritical water or subcritical water is injected from a water injection valve, it is possible to flexibly change an injection pressure. However, taking into consideration an injection efficiency and practical aspects, it is preferable to set an injection pressure to be not smaller than 20 MPa but not larger than 30 MPa.

Further, in the first and second embodiments, there is described an example, in which the present invention is applied to a gasoline engine, in which HCCI combustion such that a mixture of gasoline and air is compressed for self-ignition is performed in all the operating ranges of the engine. The engine to which the present invention is applicable, however, is not limited to the engine as described above. For instance, the present invention is applicable to an engine, in which HCCI combustion is performed in a certain operating range, and spark ignition combustion is performed in the other operating range(s), or to an engine in which HCCI combustion is performed by using fuel other than gasoline.

(4) Summary

The following is a summary of the embodiments and modifications thereof.

A homogeneous charge compression ignition engine includes a cylinder configured to accommodate a piston to be reciprocally movable; a fuel injection valve configured to inject fuel into the cylinder; a water injection valve configured to inject water into the cylinder; and a control device configured to combust a mixture of fuel injected from the fuel injection valve and air by self-ignition within the cylinder. The control device includes a fuel injection control module configured to inject fuel from the fuel injection valve into the cylinder at such a timing that the air-fuel mixture is self-ignited in a latter stage of a compression stroke or in an initial stage of an expansion stroke, and a water injection control module configured to perform at least a basic water injection of injecting water from the water injection valve into the cylinder during a predetermined period which starts concurrently with or after start of combustion by the self-ignition and which overlaps a combustion period.

In the aforementioned configuration, a latter stage of a compression stroke is a range from 60° degrees CA before the compression top dead center (BTDC) to the compression top dead center, and an initial stage of an expansion stroke is a range from the compression top dead center to 60° CA after the compression top dead center (ATDC).

According to the aforementioned configuration, water being an inert substance is supplied into the cylinder during combustion by the basic water injection which is started concurrently with or after self-ignition of an air-fuel mixture (start of HCCI combustion). This makes it possible to avoid a situation such that combustion rapidly progresses and the cylinder pressure excessively increases, and to suppress an increase of combustion noise by the rapid increase in the cylinder pressure (an increase in a pressure increase rate).

Further, the basic water injection is performed only concurrently with or after self-ignition of an air-fuel mixture (start of combustion), and water is not supplied into the cylinder at a point of time before self-ignition. Therefore, it is possible to prevent a situation such that a timing of self-ignition of an air-fuel mixture shifts to the retard side with respect to an intended timing by the existence of water. According to the aforementioned configuration, combustion energy is efficiently transferred to the piston, and is converted to a torque. This is advantageous in sufficiently securing an output torque of the engine.

As described above, the aforementioned configuration is advantageous in suppressing an increase in the cylinder pressure (an increase of combustion noise by the increase in the cylinder pressure), while securing an output torque of the engine.

Preferably, the water injection control module may control the water injection valve in such a manner that the basic water injection is started substantially concurrently with start of the combustion and is terminated during the combustion.

As described above, in a case where the basic water injection is started substantially concurrently with start of combustion (self-ignition of an air-fuel mixture), it is possible to suppress progress of combustion immediately after self-ignition by the existence of water as an inert substance. This is advantageous in avoiding a situation such that the cylinder pressure rapidly increases immediately after self-ignition, and in suppressing combustion noise. Further, the basic water injection is terminated during combustion. This is advantageous in sufficiently securing an output torque of the engine, without excessively suppressing progress of combustion.

In the aforementioned configuration, more preferably, the water injection control module may perform an additional water injection in addition to the basic water injection, the additional water injection being started after the basic water injection is terminated and before the combustion ends, and a non injection period when water is not injected may be provided between the basic water injection and the additional water injection.

According to the aforementioned configuration, after the basic water injection is terminated during combustion, the additional water injection is started before the combustion ends. This makes it possible to suppress progress of combustion after the basic water injection is terminated, and an increase in the cylinder pressure resulting from the progress of the combustion, by the additional water injection; and to avoid a situation such that the maximum value of the cylinder pressure excessively increases (e.g. over an allowable value in terms of design). This is advantageous in avoiding a situation such that components such as a piston and a cylinder head are damaged by excessive application of a pressure to the components, and in securing reliability of the engine.

Further, there is provided the non injection period when water is not injected between the basic water injection and the additional water injection. Therefore, it is possible to avoid excessively suppressing progress of combustion and thereby to avoid a situation such that a combustion centroid (in other words, a timing when combustion of 50% by mass of fuel to be injected per cycle is completed) excessively shifts to the retard side. This makes it possible to efficiently transfer combustion energy to the piston for conversion to a torque. This is advantageous in sufficiently securing an output torque of the engine without particularly increasing the injection amount of fuel, and to improve fuel economy.

In the aforementioned configuration, more preferably, the control device may further include an ignition determination module configured to determine that combustion starts by self-ignition of the air-fuel mixture, and the water injection control module may control the water injection valve in such a manner that the basic water injection is started at a point of time when the ignition determination module determines that the air-fuel mixture is self-ignited.

According to the aforementioned configuration, it is possible to start the basic water injection without a delay in association with self-ignition of an air-fuel mixture. This is advantageous in suppressing a rapid increase in the cylinder pressure immediately after self-ignition, and an increase of combustion noise by the rapid increase in the cylinder pressure. Further, water is not injected before self-ignition. This is advantageous in preventing a situation such that a self-ignition timing is delayed by water injection.

In the aforementioned configuration, more preferably, the engine may further include a cylinder pressure sensor configured to detect a cylinder pressure being an inner pressure of the cylinder. The ignition determination module may determine that the air-fuel mixture is self-ignited at a point of time when the cylinder pressure sensor detects a rapid increase in the cylinder pressure by start of the combustion.

According to the aforementioned configuration, it is possible to accurately specify self-ignition of the air-fuel mixture (start of the combustion) with use of the cylinder pressure sensor.

In a case where the engine includes the cylinder pressure sensor, the water injection control module may control the water injection valve based on a detection value of the cylinder pressure sensor in such a manner that the basic water injection is terminated during a period when the cylinder pressure increases after the combustion starts. More specifically, the water injection control module may control the water injection valve in such a manner that the basic water injection is terminated at a point of time when a rate of increase of a cylinder pressure specified from a detection value of the cylinder pressure sensor falls below a predetermined threshold value.

According to the aforementioned configuration, it is possible to accurately specify an appropriate timing when the basic water injection is terminated with use of the cylinder pressure sensor.

In the aforementioned configuration, more preferably, the water injection control module may control the water injection valve in such a manner that the additional water injection is started at a point of time when the cylinder pressure detected by the cylinder pressure sensor exceeds a predetermined threshold value after the basic water injection is terminated.

According to the aforementioned configuration, it is possible to securely start the additional water injection before the cylinder pressure increases to such a level that may affect reliability of the engine. This is advantageous in suppressing the maximum value of the cylinder pressure to an appropriate level by the additional water injection.

The effective compression ratio of the cylinder may be set to be not smaller than 13 but not larger than 27. In this case, the water injection control module may control the water injection valve in such a manner that the additional water injection is started at a point of time when 40 to 95% by mass of fuel to be injected from the fuel injection valve per cycle is combusted.

A high effective compression ratio of not smaller than 13 but not larger than 27 is advantageous in establishing a high-temperature and high-pressure environment where an air-fuel mixture is easily self-ignited, and is advantageous in enhancing thermal efficiency. However, such a high effective compression ratio may excessively increase the maximum value of the cylinder pressure, and may adversely affect reliability of the engine. According to a study by the inventors of the present application, when it is assumed that the additional water injection is started before the cylinder pressure exceeds an allowable value in the aforementioned configuration, a preferable timing when the additional water injection is started is a point of time when 40 to 95% by mass of fuel to be injected per cycle is combusted. In view of the above, the aforementioned configuration in which the additional water injection is started at a point of time when 40 to 95% by mass of fuel is combusted is advantageous in suppressing the maximum value of the cylinder pressure by the additional water injection, and in securing reliability of the engine in a satisfactory manner.

Alternatively, the water injection control module may control the water injection valve in such a manner that the basic water injection is started substantially concurrently with start of the combustion, and the water injection control module may control the water injection valve to continue the basic water injection at least until a specific point of time during the combustion when a cylinder pressure being an inner pressure of the cylinder reaches a maximum value.

As described above, in a case where the basic water injection is continued from a point of time when combustion starts until a point of time when the cylinder pressure reaches the maximum value, it is possible to securely avoid a situation such that the maximum value of the cylinder pressure excessively increases (e.g. exceeds an allowable value in terms of design) by the action of water to be continuously supplied by the basic water injection. This is advantageous in avoiding a situation such that components such as a piston and a cylinder head are damaged by excessive application of a pressure to the components, and in securing reliability of the engine.

Preferably, the engine may further include a critical water generation device configured to generate supercritical water or subcritical water as the water. The water injection valve may be operative to inject supercritical water or subcritical water generated by the critical water generation device into the cylinder.

As described above, in a case where supercritical/subcritical water is injected from the water injection valve into the cylinder, as compared with a case where gaseous water (steam) having a low density is injected, it is possible to supply a large amount of water into the cylinder within a short period, and to efficiently supply a sufficient amount of water that enables to appropriately suppress an increase in the cylinder pressure into the cylinder. Further, as compared with a case where liquefied water is injected, the aforementioned configuration is advantageous in suppressing temperature lowering of the cylinder resulting from absorption of latent heat by water, and in suppressing lowering of an output torque of the engine due to the temperature lowering. Furthermore, supercritical/subcritical water injected into the cylinder not only makes combustion redundant, but also keeps the cylinder pressure in an expansion stroke to a relatively high value by expansion of the supercritical/subcritical water to thereby increase the work of pushing down the piston. Therefore, the aforementioned configuration in which supercritical/subcritical water having the aforementioned properties is injected into the cylinder makes it possible to sufficiently secure an output torque of the engine, while efficiently suppressing an increase in the cylinder pressure.

The fuel injection valve may be preferably configured to inject fuel containing gasoline as a main component. Specifically, the present invention is applicable to a homogenous charge compression ignition gasoline engine, in which fuel containing gasoline as a main component is self-ignited while being mixed with air.

This application is based on Japanese Patent Application No. 2016-170520 and No. 2016-170521 filed on Sep. 1, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A homogeneous charge compression ignition engine, comprising:
a cylinder configured to accommodate a piston to be reciprocally movable;
a fuel injection valve configured to inject fuel into the cylinder;
a water injection valve configured to inject water into the cylinder;
a control device configured to combust a mixture of fuel injected from the fuel injection valve and air by self-ignition within the cylinder,
the control device includes
a fuel injection control module configured to inject fuel from the fuel injection valve into the cylinder at such a timing that the air-fuel mixture is self-ignited in a latter stage of a compression stroke or in an initial stage of an expansion stroke,
an ignition module that determines whether or not heat is generated by the combustion, and
a water injection control module configured to perform a first water injection of injecting water from the water injection valve into the cylinder,
the first water injection is performed during a predetermined period which starts at a point of time that the ignition module determines that heat is generated by the combustion, and
the first water injection is terminated during the combustion.

2. The homogeneous charge compression ignition engine according to claim 1, wherein
the water injection control module performs a second water injection in addition to the first water injection, the second water injection being started after the first water injection is terminated and before the combustion ends, and
a non-injection period when water is not injected is provided between the first water injection and the second water injection.

3. The homogeneous charge compression ignition engine according to claim 2, further comprising:
a cylinder pressure sensor configured to detect a cylinder pressure being an inner pressure of the cylinder, wherein
the water injection control module controls the water injection valve based on a detection value of the cylinder pressure sensor in such a manner that the first water injection is terminated during a period when the cylinder pressure increases after the combustion starts.

4. The homogeneous charge compression ignition engine according to claim 3, wherein
the water injection control module controls the water injection valve in such a manner that the first water injection is terminated at a point of time when a rate of increase of a cylinder pressure specified from a detection value of the cylinder pressure sensor falls below a predetermined threshold value.

5. The homogeneous charge compression ignition engine according to claim 4, wherein
the water injection control module controls the water injection valve in such a manner that the second water injection is started at a point of time when the cylinder pressure detected by the cylinder pressure sensor exceeds a predetermined threshold value after the first water injection is terminated.

6. The homogeneous charge compression ignition engine according to claim 4, wherein
an effective compression ratio of the cylinder is set to be not smaller than 13 but not larger than 27, and
the water injection control module controls the water injection valve in such a manner that the second water injection is started at a point of time when 40 to 95% by mass of fuel to be injected from the fuel injection valve per cycle is combusted.

7. The homogeneous charge compression ignition engine according to claim 3, wherein
the water injection control module controls the water injection valve in such a manner that the second water injection is started at a point of time when the cylinder pressure detected by the cylinder pressure sensor exceeds a predetermined threshold value after the first water injection is terminated.

8. The homogeneous charge compression ignition engine according to claim 3, wherein
an effective compression ratio of the cylinder is set to be not smaller than 13 but not larger than 27, and
the water injection control module controls the water injection valve in such a manner that the second water injection is started at a point of time when 40 to 95% by mass of fuel to be injected from the fuel injection valve per cycle is combusted.

9. The homogeneous charge compression ignition engine according to claim 1, further comprising:
a cylinder pressure sensor configured to detect a cylinder pressure being an inner pressure of the cylinder, wherein the ignition determination module determines that the air-fuel mixture is self-ignited at a point of time when the cylinder pressure sensor detects a rapid increase in the cylinder pressure by start of the combustion.

10. The homogeneous charge compression ignition engine according to claim 1, wherein
the water injection control module controls the water injection valve to continue the first water injection at least until a specific point of time during the combustion when a cylinder pressure being an inner pressure of the cylinder reaches a maximum value.

11. The homogeneous charge compression ignition engine according to claim 10, further comprising:
a critical water generator configured to generate supercritical water having a temperature of 647 K or higher or subcritical water having another temperature that is higher than 600K and lower than 647K as the water, wherein
the water injection valve is operative to inject supercritical water or subcritical water generated by the critical water generation device into the cylinder.

12. The homogeneous charge compression ignition engine according to claim 10, further comprising:
a critical water generator configured to generate supercritical water having a temperature of 647 K or higher or subcritical water having another temperature that is higher than 600K and lower than 647K as the water, wherein
the water injection valve is operative to inject supercritical water or subcritical water generated by the critical water generation device into the cylinder, and
the fuel injection valve is operative to inject fuel containing gasoline as a main component.

13. The homogeneous charge compression ignition engine according to claim 1, further comprising:
a critical water generator configured to generate supercritical water having a temperature of 647 K or higher or subcritical water having another temperature that is higher than 600K and lower than 647K as the water, wherein
the water injection valve is operative to inject supercritical water or subcritical water generated by the critical water generation device into the cylinder.

14. The homogeneous charge compression ignition engine according to claim 1, further comprising:
a critical water generator configured to generate supercritical water having a temperature of 647 K or higher or subcritical water having another temperature that is higher than 600K and lower than 647K as the water, wherein
the water injection valve is operative to inject supercritical water or subcritical water generated by the critical water generation device into the cylinder, and
the fuel injection valve is operative to inject fuel containing gasoline as a main component.

15. The homogeneous charge compression ignition engine according to claim 1, wherein
the water injection control module performs the first water injection so as to avoid a rapid increase in the cylinder pressure immediately after self-ignition starts.

16. The homogeneous charge compression ignition engine according to claim 1, wherein the control device controls that the homogeneous charge compression ignition combustion is performed:
in a state where the homogeneous charge compression ignition engine is operating in a first operating range on a high load side and supercritical water is being injected from the water injection valve, and
in a state where the homogeneous charge compression ignition engine is operating in a second operating range on a low load side and injection of supercritical water from the water injection valve is stopped.

17. A homogeneous charge compression ignition engine, comprising:
a cylinder configured to accommodate a piston to be reciprocally movable;
a fuel injection valve configured to inject fuel into the cylinder;
a water injection valve configured to inject water into the cylinder;
a control device configured to combust a mixture of fuel injected from the fuel injection valve and air by self-ignition within the cylinder,
the control device includes
a fuel injection control module configured to inject fuel from the fuel injection valve into the cylinder at such a timing that the air-fuel mixture is self-ignited in a latter stage of a compression stroke or in an initial stage of an expansion stroke,
an ignition module that determines whether or not heat is generated by the combustion, and
a water injection control module configured to perform a first water injection of injecting water from the water injection valve into the cylinder,
the first water injection is performed during a predetermined period which starts at a point of time that the ignition module determines that heat is generated by the combustion,
the first water injection is prohibited before the combustion, and
the first water injection is terminated during the combustion.

* * * * *